(12) United States Patent
Honma

(10) Patent No.: US 8,132,107 B2
(45) Date of Patent: Mar. 6, 2012

(54) MULTIFUNCTIONAL APPARATUS, METHOD FOR CONTROLLING MULTIFUNCTIONAL APPARATUS, CONTROL APPARATUS, METHOD FOR CONTROLLING CONTROL APPARATUS, SYSTEM FOR CONTROLLING MULTIFUNCTIONAL APPARATUS, CONTROL PROGRAM, AND COMPUTER-READABLE STORAGE MEDIUM

(75) Inventor: Tomoyuki Honma, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 632 days.

(21) Appl. No.: 11/799,951

(22) Filed: May 2, 2007

(65) Prior Publication Data

US 2007/0283295 A1 Dec. 6, 2007

(30) Foreign Application Priority Data

May 31, 2006 (JP) ................................ 2006-152786

(51) Int. Cl.
*G06F 3/048* (2006.01)
(52) U.S. Cl. ......... 715/740; 715/847; 715/827; 358/400
(58) Field of Classification Search .................. 715/847, 715/740, 827; 358/400
See application file for complete search history.

(56) References Cited

U.S. PATENT DOCUMENTS

| | | | |
|---|---|---|---|
| 2003/0011633 A1* | 1/2003 | Conley et al. ................. | 345/762 |
| 2003/0088651 A1* | 5/2003 | Wilson, Jr. .................... | 709/221 |
| 2004/0070630 A1* | 4/2004 | Nagoshi et al. ............... | 345/810 |
| 2004/0083260 A1* | 4/2004 | Kobayashi et al. ........... | 709/201 |
| 2004/0160630 A1* | 8/2004 | Iriyama et al. ............... | 358/1.15 |
| 2004/0169881 A1* | 9/2004 | Sato ............................. | 358/1.15 |
| 2005/0046887 A1* | 3/2005 | Shibata et al. ............... | 358/1.13 |
| 2006/0230045 A1* | 10/2006 | Konishi ......................... | 707/10 |

FOREIGN PATENT DOCUMENTS

JP 04-296921 10/1992

(Continued)

OTHER PUBLICATIONS

Sharp Kabushiki Kaisha, "Digital color multifunctional apparatus," retrieved on Apr. 4, 2006, http://www.sharp.co.jp/products/mx4501fn/text/function.html.

(Continued)

*Primary Examiner* — Boris Pesin
*Assistant Examiner* — Daeho Song
(74) *Attorney, Agent, or Firm* — David G. Conlin; Steven M. Jensen; Edward Wildman Palmer LLP

(57) ABSTRACT

A multifunctional apparatus is capable of switching between a standard operation mode in which a Web service layer stops operating and an OS mode in which the Web service layer operates. In the OS mode, the multifunctional apparatus informs an external control apparatus of pressed-hardware-button information indicative of a pressed hardware button detected by a user interface layer. In the control apparatus, an event process section reads out, from a shortcut button storage section, process-contents information corresponded with button identification information indicative of the hardware button indicated by the pressed-hardware-button information, and a device control section transmits, to the multifunctional apparatus, a control instruction for executing a device process indicated by the process-contents information. Thereafter, in the multifunctional apparatus, the Web service layer acquires the control instruction from the control apparatus and executes the device process in accordance with the acquired control instruction. This allows for realizing a system for controlling a multifunctional apparatus, capable of executing, with only one touch, a process that has been registered.

16 Claims, 19 Drawing Sheets

FOREIGN PATENT DOCUMENTS

| | | |
|---|---|---|
| JP | 05-347657 | 12/1993 |
| JP | 07-036651 | 2/1995 |
| JP | 09-171329 | 6/1997 |
| JP | 09-204256 | 8/1997 |
| JP | 2003-177854 | 6/2003 |
| JP | 2004-228687 | 8/2004 |
| JP | 2004-536513 | 12/2004 |
| JP | 2005-064817 | 3/2005 |

OTHER PUBLICATIONS

"Sharp released 12 models of digital full-colored multifunctional apparatuses for companies," ascii24.com, Nov. 24, 2005, retrieved on Apr. 4, 2006, http://ascii24.com/news/i/hard/article/2005/11/24/659226-000.html.

* cited by examiner

FIG. 7

| FIRST API FROM OSA APPLICATION LAYER | SECOND API PUBLISHED BY SERVICE LAYER (IN THE ORDER OF CALLING) | | | |
|---|---|---|---|---|
| | FIRST ORDER | SECOND ORDER | THIRD ORDER | FOURTH ORDER |
| ExecuteCopy | Do Scan | Do Print | | |
| ExecuteScan | Do Scan | SaveFile | SendByFTP | |
| ExecuteFAX | Do Scan | SaveFile | SendByLine | |
| ExecutePrint | SaveFile | DoPrint | | |
| ... | ... | ... | ... | ... |

FIG. 10

| ADDRESS | http://localhost/ShortCutProgram/main.html |

FIG. 12

| PROCESS NAME | CONTROL INSTRUCTION (IN THE ORDER OF CALLING) | | | |
| --- | --- | --- | --- | --- |
| | FIRST ORDER | SECOND ORDER | THIRD ORDER | FOURTH ORDER |
| SCAN | JobCreate | ExecuteScan | JobClose | |
| ... | ... | ... | ... | ... |

FIG. 13

| PRESSED BUTTON INFORMATION | | | BLOCK INSTRUCTED TO EXECUTE PROCESS AND CONTENTS OF THE PROCESS | | | |
|---|---|---|---|---|---|---|
| OPERATION WINDOW | WINDOW BUTTON | HARDWARE BUTTON | UI CONTROL SECTION | APPLICATION SECTION | DEVICE CONTROL SECTION | EVENT PROCESS SECTION |
| SCAN EXECUTION WINDOW | OK BUTTON | | | | SCAN EXECUTION | |
| SCAN EXECUTION WINDOW | | ALL BUTTONS | | | | |
| INITIAL MENU WINDOW | ENGLISH-JAPANESE TRANSLATION PRINTING BUTTON | | PARAMETER A ENTRY WINDOW | | | |
| PARAMETER A ENTRY WINDOW | OK BUTTON | | PARAMETER B ENTRY WINDOW | OCR APPLICATION | | |
| PARAMETER B ENTRY WINDOW | OK BUTTON | | PARAMETER C ENTRY WINDOW | TRANSLATION APPLICATION | | |
| PARAMETER C ENTRY WINDOW | OK BUTTON | | "NOW PRINTING" WINDOW | PRINTING JOB GENERATING APPLICATION | | |
| ... | ... | | ... | ... | ... | |
| LOG IN WINDOW | OK BUTTON | | WINDOW XXX ("LOGGING IN") | AUTHENTICATION APPLICATION | | |
| ... | ... | ALL BUTTONS | | | | |
| SHORTCUT BUTTON PRESSING INSTRUCTION WINDOW | | | | | | TRANSMIT PRESSED HARDWARE BUTTON INFORMATION |

FIG. 14

<LOG IN USER A>

| HARDWARE BUTTON | NUMBER OF PROCESSES | PROCESS CONTENTS INFORMATION ||||||||||
|---|---|---|---|---|---|---|---|---|---|---|---|
| | | EXECUTION ORDER 1 ||| EXECUTION ORDER 2 ||| EXECUTION ORDER 3 ||| EXECUTION ORDER 4 ||
| | | INPUT DATA INFORMATION | PROCESS 1 | OUTPUT DATA FORMAT 1 | PROCESS 2 | OUTPUT DATA FORMAT 2 | PROCESS 3 | OUTPUT DATA FORMAT 3 | PROCESS 4 |
| 0 | 4 | NONE | IMAGE PROCESSING APPARATUS: SCAN | PDF | COMPUTER: OCR.exe | RTF | COMPUTER: Translate.exe | RTF | IMAGE PROCESSING APPARATUS: PRINTING |
| START | 2 | DATA NAME: XX, ADDRESS: YY | COMPUTER: Edit.exe | TIF | IMAGE PROCESSING APPARATUS: PRINTING | NONE | NONE | NONE | NONE |
| CLEAR | 3 | NONE | IMAGE PROCESSING APPARATUS: SCAN | TIF | COMPUTER: AddPage.exe | TIF | IMAGE PROCESSING APPARATUS: FAX TRANSMISSION | NONE | NONE |

<LOG IN USER B>

| HARDWARE BUTTON | NUMBER OF PROCESSES | PROCESS CONTENTS INFORMATION ||||||||||
|---|---|---|---|---|---|---|---|---|---|---|---|
| | | EXECUTION ORDER 1 ||| EXECUTION ORDER 2 ||| EXECUTION ORDER 3 ||| EXECUTION ORDER 4 ||
| | | INPUT DATA INFORMATION | PROCESS 1 | OUTPUT DATA FORMAT 1 | PROCESS 2 | OUTPUT DATA FORMAT 2 | PROCESS 3 | OUTPUT DATA FORMAT 3 | PROCESS 4 |
| 0 | 2 | NONE | IMAGE PROCESSING APPARATUS: SCAN | PDF | COMPUTER: Save.exe | NONE | NONE | NONE | NONE |
| START | 1 | DATA NAME: ZZ, ADDRESS: YY | IMAGE PROCESSING APPARATUS: PRINTING | NONE | NONE | NONE | NONE | NONE | NONE |
| CLEAR | 3 | NONE | IMAGE PROCESSING APPARATUS: SCAN | TIF | COMPUTER: AddPage.exe | TIF | IMAGE PROCESSING APPARATUS: FAX TRANSMISSION | NONE | NONE |

FIG. 18

REGISTRATION OF SHORTCUT BUTTON

BUTTON: [ 0 ▶ ]

CONTENTS OF PROCESS:

| INPUT | PROCESS 1 | OUTPUT 1 | PROCESS 2 | OUTPUT 2 | PROCESS 3 |
|-------|-----------|----------|-----------|----------|-----------|
| NONE | SCAN | PDF | Translate.exe | RTF | PRINT |

MULTIFUNCTIONAL APPARATUS, METHOD FOR CONTROLLING MULTIFUNCTIONAL APPARATUS, CONTROL APPARATUS, METHOD FOR CONTROLLING CONTROL APPARATUS, SYSTEM FOR CONTROLLING MULTIFUNCTIONAL APPARATUS, CONTROL PROGRAM, AND COMPUTER-READABLE STORAGE MEDIUM

This non-provisional application claims priority under 35 U.S.C. §119(a) on Patent Application No. 152786/2006 filed in Japan on May 31, 2006, the entire contents of which are hereby incorporated by reference.

FIELD OF THE INVENTION

The present invention relates to a system for controlling a multifunctional apparatus, in which system a multifunctional apparatus and a control apparatus for controlling the multifunctional apparatus are connected with each other via a communication network.

BACKGROUND OF THE INVENTION

There have been known multifunctional apparatuses including a plurality of functions such as a copy function, a scan function, a printing function, and a FAX transmission/reception function. Recently, such multifunctional apparatuses are connected with PCs (Personal Computers) via a communication network, and perform various processes.

The system proposed by the applicants of the present application associates applications executed on PCs with functions of multifunctional apparatuses based on SOAP (Simple Object Access Protocol), allowing the multifunctional apparatuses to function as a part of a total application system. Consequently, it is easy to provide a flexible service in which functions of the multifunctional apparatuses are combined with functions of PCs as needed (see Citations 3 and 4 cited below).

Further, there have been known functions such as a function for representing a receiving end by use of a shortcut key and performing FAX transmission to the represented receiving end.

As for a technique of short cut keys, Citation 1 cited below discloses a technique in which short cut keys are displayed on a window and Citation 2 discloses a technique in which a command to be executed is selected from a menu and an option parameter of the command is entered to a dialog box, thereby assigning the command to a command shortcut button.

However, in displaying a shortcut button on a window, the short cut button indicates only execution of a command corresponding to the shortcut button. Therefore, it is necessary to provide a new shortcut button for each command.
[Citation 1]
Japanese Unexamined Patent Publication No. 177854/2003 (Tokukai 2003-177854: published on Jun. 27, 2003)
[Citation 2]
Japanese Unexamined Patent Publication No. 36651/1995 (Tokukai 1995-36651: published on Feb. 7, 1995)
[Citation 3]
Sharp Corporation, [Digital color multifunctional apparatus . . . ], [online], [searched on Apr. 4, 2006], the Internet <URL: http://www.sharp.co.jp/products/mx4501fn/text/function.html>
[Citation 4]
Hisashi Kobayashi, [Sharp released 12 models of digital full-colored multifunctional apparatuses for companies . . . ], [online], Nov. 24, 2005, ascii24.com, [searched on Apr. 4, 2006], the Internet <URL: http://ascii24.com/news/i/hard/article/2005/11/24/659 226-000.html>

SUMMARY OF THE INVENTION

An object of the present invention is to provide a system for controlling a multifunctional apparatus, in which functions of a control apparatus and functions of a multifunctional apparatus cooperate with each other, the system allowing for executing, with only one touch, a process having been registered, without providing a new button.

In order to achieve the foregoing object, the multifunctional apparatus of the present invention is a multifunctional apparatus, executing a device process obtained by suitably combining element functions which include (i) at least one of an image reading function and an image forming function and (ii) a communication function, comprising: input buttons; pressed button detecting means for detecting one of the input buttons which has been pressed; first execution means for executing a device process which has been corresponded with said one of the input buttons detected by the pressed button detecting means; pressed button information informing means for informing an external control apparatus of pressed button information indicative of said one of the input buttons detected by the pressed button detecting means; second execution means for acquiring, from the control apparatus, a control instruction corresponding to said one of the input buttons indicated by the pressed button information informed by the pressed button information informing means and for executing a device process in accordance with the acquired control instruction; and mode setting means for setting either (i) a first mode in which the first execution means operates and the pressed button information informing means and the second execution means stop operating or (ii) a second mode in which the first execution mode stops operating and the pressed button information informing means and the second execution means operate.

Further, the control apparatus of the present invention is a control apparatus, connected via a communication network with the multifunctional apparatus and controlling the device process of the multifunctional apparatus, said control apparatus comprising: a storage section in which shortcut information is stored, the shortcut information being information in which (i) button identification information by which an input button of the multifunctional apparatus is identified and (ii) at least one device process identification information indicative of a device process in the multifunctional apparatus are corresponded with each other; reading means for acquiring, from the multifunctional apparatus, pressed button information indicative of a pressed input button out of the input buttons of the multifunctional apparatus, and for reading out, from the storage section, device process identification information corresponded with button identification information indicative of the input button indicated by the pressed button information; and control instruction transmitting means for transmitting, to the multifunctional apparatus, a control instruction for executing a device process indicated by the device process identification information read out by the reading means.

Here, examples of the device process include a printing process, a copy process, a FAX transmission process, a scan process, and a document filing process in which an image having been subjected to the printing process, the FAX process, or the scan process is stored in the storage device.

With the arrangement, when an input button is pressed in the first mode, the first execution means executes a device process which has been corresponded with the input button. On the other hand, when the same input button is pressed in the second mode, the pressed button information informing means informs the external control apparatus of pressed button information indicative of the pressed input button, and the second execution means acquires, from the control apparatus, a control instruction corresponding to the input button indicated by the pressed button information, and executes a device process in accordance with the acquired control instruction.

Therefore, it is possible to perform different processes in the first mode and in the second mode in response to pressing of the same input button.

Further, the control instruction acquired by the second execution means is transmitted from the control apparatus. The control apparatus includes the storage section in which shortcut information is stored, the shortcut information being information in which (i) button identification information by which an input button of the multifunctional apparatus is identified and (ii) at least one device process identification information indicative of a device process in the multifunctional apparatus are corresponded with each other. Consequently, in the second mode, a user can use an input button of the multifunctional apparatus as a shortcut button with which a device process indicated by the device process identification information included in the shortcut information is to be executed. That is, the input button of the multifunctional apparatus is corresponded with an original device process in the first mode and the input button serves as a shortcut button only in the second mode. Consequently, it is unnecessary to provide a new shortcut button.

Further, when a plurality of multifunctional apparatuses capable of communicating with the same control apparatus are in the second mode, a user can cause the multifunctional apparatuses to execute the same device process by pressing the same input button.

As described above, with the arrangement, it is possible to execute, with only one touch, a process having been registered, without providing a new button.

For a fuller understanding of the nature and advantages of the invention, reference should be made to the ensuing detailed description taken in conjunction with the accompanying drawings.

BRIEF DESCRIPTION OF THE DRAWINGS

FIG. 7 is a drawing of an embodiment of the present invention, showing an example of a control instruction table stored in a control instruction table storage section of a control apparatus.

FIG. 10 is a drawing showing an example of an address stored in an address storage section.

FIG. 12 is a drawing showing an example of a control instruction table.

FIG. 13 is a drawing showing an example of an event table.

FIG. 14 is a drawing showing an example of information stored in a shortcut button storage section.

FIG. 18 is a drawing showing an example of a window for registering a shortcut button.

DESCRIPTION OF THE EMBODIMENTS

Figure 1:
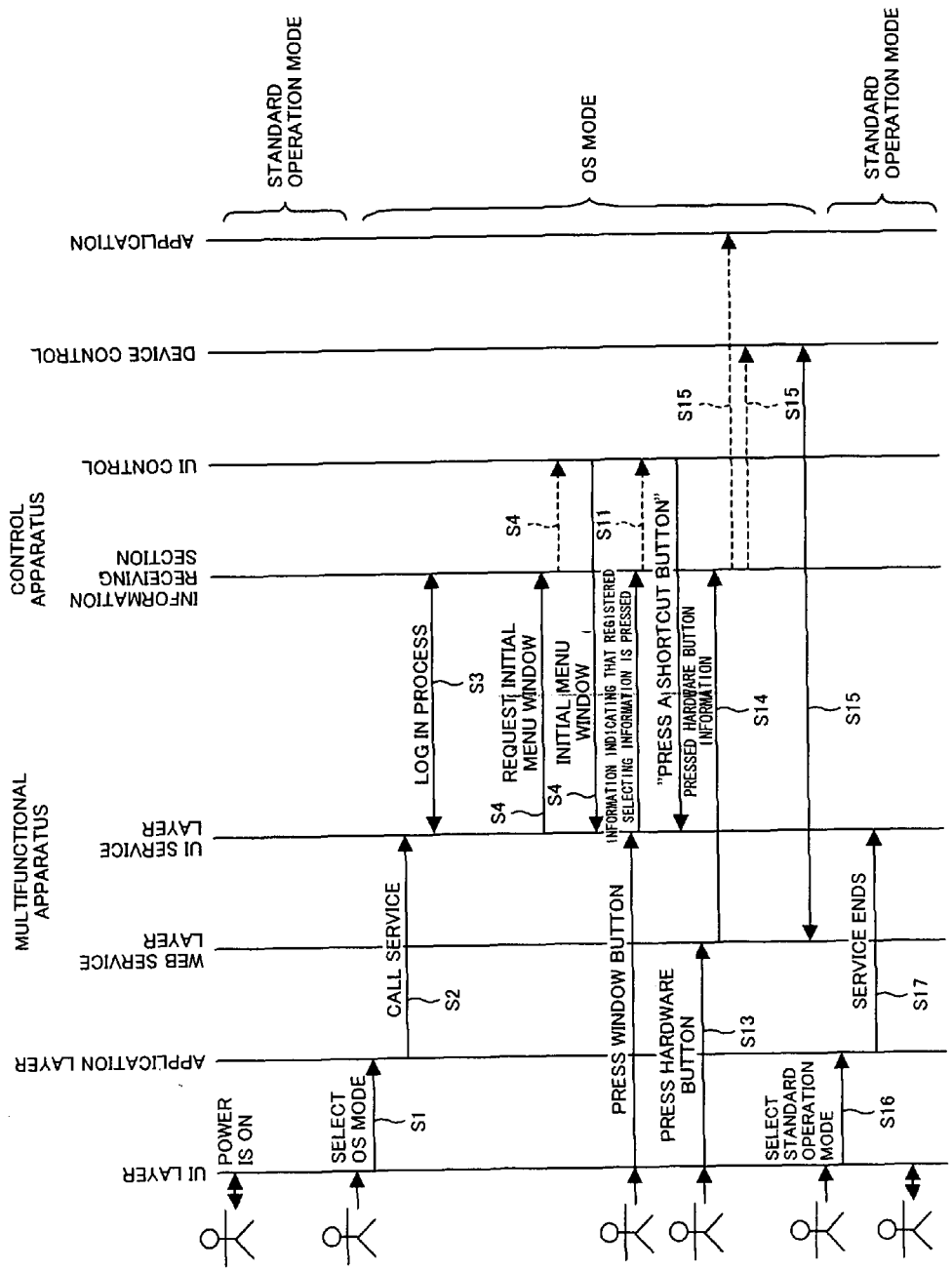
FIG. 1 is a drawing of an embodiment of the present invention, showing timings of operations performed in using a shortcut button.

The following explains an embodiment of the present invention with reference to FIGS. 1 to 19. An explanation will be made below as to an embodiment of a system of the present invention for controlling a multifunctional apparatus. FIG. 2 is a drawing schematically showing the system of the present embodiment for controlling a multifunctional apparatus.

As shown in FIG. 2, the system of the present embodiment includes a multifunctional apparatus 1 and a control apparatus 2. The multifunctional apparatus 1 and the control apparatus 2 are connected with each other via a communication network. The system may include a plurality of multifunctional apparatuses 1 and may include a plurality of control apparatuses 2.

Examples of the communication network via which the multifunctional apparatus 1 and the control apparatus 2 are connected with each other include the Internet, a telephone line, a serial cable, and other wired communication lines and wireless communication lines.

In the present embodiment, the multifunctional apparatus 1 can switch between: an open system (OS) mode in which the multifunctional apparatus 1 receives control instructions from the control apparatus 2 and functions in accordance with the control instructions; and a standard operation mode in which the multifunctional apparatus 1 functions without receiving control instructions from the control apparatus 2. In the OS mode, the multifunctional apparatus 1 informs the control apparatus 2 of pressed-button information indicative of a pressed button.

The control apparatus 2 executes various application programs (such as an OCR program and a translation program) and outputs various control instructions to the multifunctional apparatus 1 in response to the pressed-button information informed by the multifunctional apparatus 1. Further, a user stores beforehand, in the control apparatus 2, short-cut information in which information of a hardware button of the multifunctional apparatus 1 is corresponded with information of one or more process items (execution of the program and an output of the control instruction). When a hardware button whose information is stored in the shortcut information (hereinafter referred to as a shortcut button) is pressed in the multifunctional apparatus 1, the control apparatus 2 performs processes indicated by a series of process items corresponded with the shortcut button (execution of the application program and an output of the control instruction). As a result, in the OS mode, the user can cause the multifunctional apparatus 1 to perform a desired series of processes only by pressing one button. In the following, a series of processes corresponded with a shortcut button may be referred to as an event process.

The following explains structures of the multifunctional apparatus 1 and the control apparatus 2.

(Hardware Structure of Multifunctional Apparatus)

The multifunctional apparatus 1 includes a plurality of image processing functions such as copy, scan (image reading function), printing (image forming function), transmission of image data (communication function), and image conversion. An example of the multifunctional apparatus 1 is an apparatus in which a printer, a copy device, a facsimile device, a scanner, and an operation device for image transmission, image conversion, and image processing are integrally formed (MFP: Multi Functional Printer). The multifunctional apparatus 1 does not necessarily includes all of the functions. The multifunctional apparatus 1 may be a one including a scan function (image reading function) and a communication function or may be a one including a printing function (image forming function) and a communication function.

Figure 3:
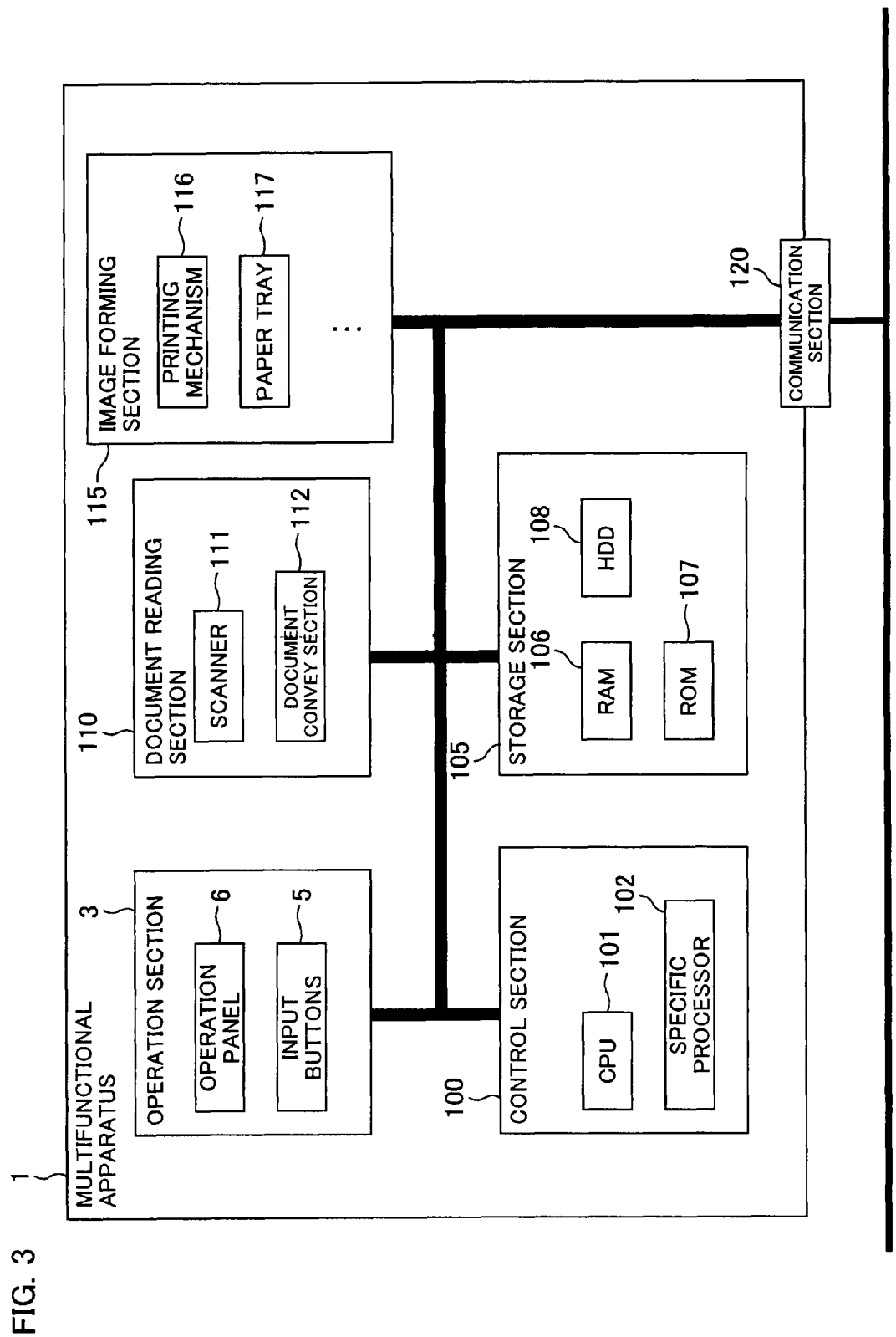
FIG. 3 is a block diagram of an embodiment of the present invention, showing a hardware structure of a multifunctional apparatus.

FIG. 3 is a block diagram showing a hardware structure of the multifunctional apparatus 1. As shown in FIG. 3, the multifunctional apparatus 1 includes an operation section 3, a document reading section 110, an image forming section 115, a control section 100, a storage section 105, and a communication section 120. These sections are connected with one another via data buses.

The operation section 3 receives instructions from a user, and includes an operation panel 6 and input buttons 5 which will be mentioned later. The document reading section 110 includes a scanner 111 and a document convey section 112, and is capable of reading, as image data, texts and images printed on documents.

The image forming section 115 prints, on a sheet such as a paper, an image (text/photograph/graphic) indicated by input image data. The image forming section 115 includes a printing mechanism 116, a paper tray 117, and other members. The communication section 120 is an interface for performing communication (including FAX transmission/reception) with external apparatuses such as the control apparatus 2.

The control section 100 includes a CPU 101 and a special processor 102. The storage section 105 includes a RAM 106, a ROM 107, and a HDD 108.

In the multifunctional apparatus 1, the CPU 101 of the control section 100 executes programs stored in the storage section 105 so as to realize various functions. The CPU 101 executes a control program for the document reading section 110 so as to perform a document reading process. The CPU 101 executes a control program for the image forming section 115 so as to perform an image forming (printing) process. The CPU 101 executes a control program for the communication section 120 so as to perform a communication process such as transmission/reception of data.

Figure 4:
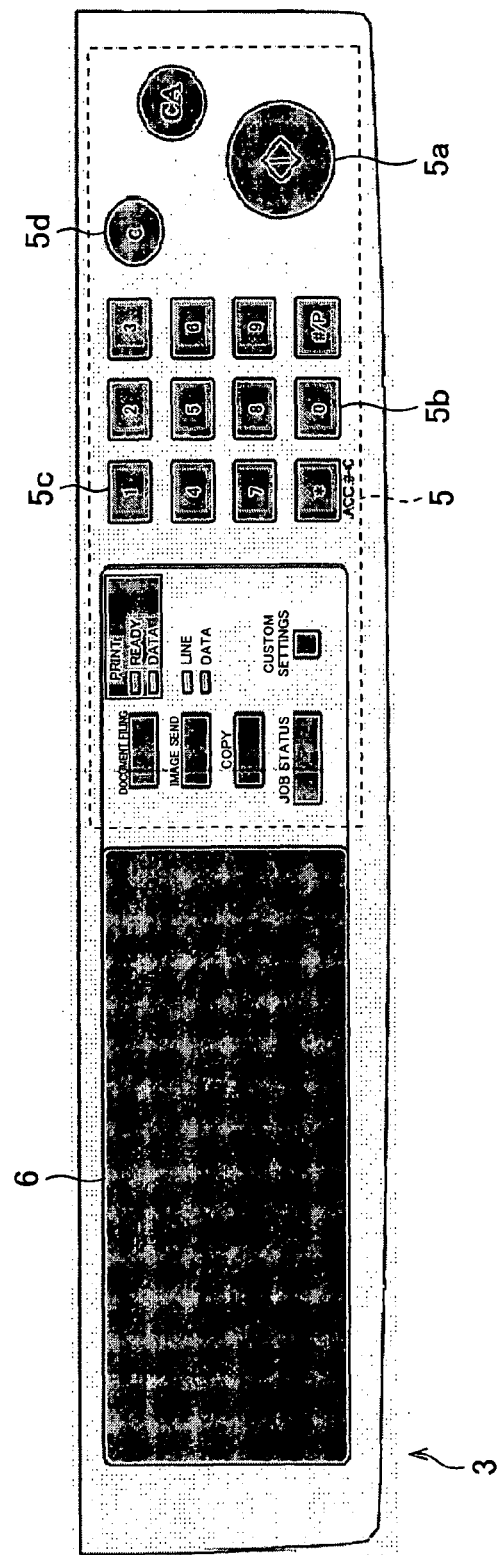
FIG. 4 is a plane drawing of an embodiment of the present invention, showing an operation section of a multifunctional apparatus.

FIG. 4 is an enlarged drawing of the operation section 3 provided in the multifunctional apparatus 1. As shown in FIG. 4, the operation section 3 includes: the operation panel (display section) 6 for displaying an operation window to the user; and the input buttons 5 for receiving instructions from the user, such as a start button 5a, a clear button 5d, ten keys including 0 button 5b and 1 button 5c. The input buttons 5 are provided in a main body of the multifunctional apparatus 1.

The operation panel 6 is a touch panel and is capable of receiving instructions from the user. That is, the operation panel is capable of displaying various buttons.

In the present specification, a button included in the input buttons 5 provided as hardware in the main body of the multifunctional apparatus 1 is referred to as a "hardware button" and a button displayed on the operation panel 6 is referred to as a "window button" so that they are discriminated from each other.

The multifunctional apparatus 1 may be connectable with a UI device instead of the operation section 3, or may be connectable with a UI device as well as with the operation section 3. At that time, an operation window is displayed on the UI device connected with the multifunctional apparatus 1.

(Hardware Structure of Control Apparatus)

Figure 5:
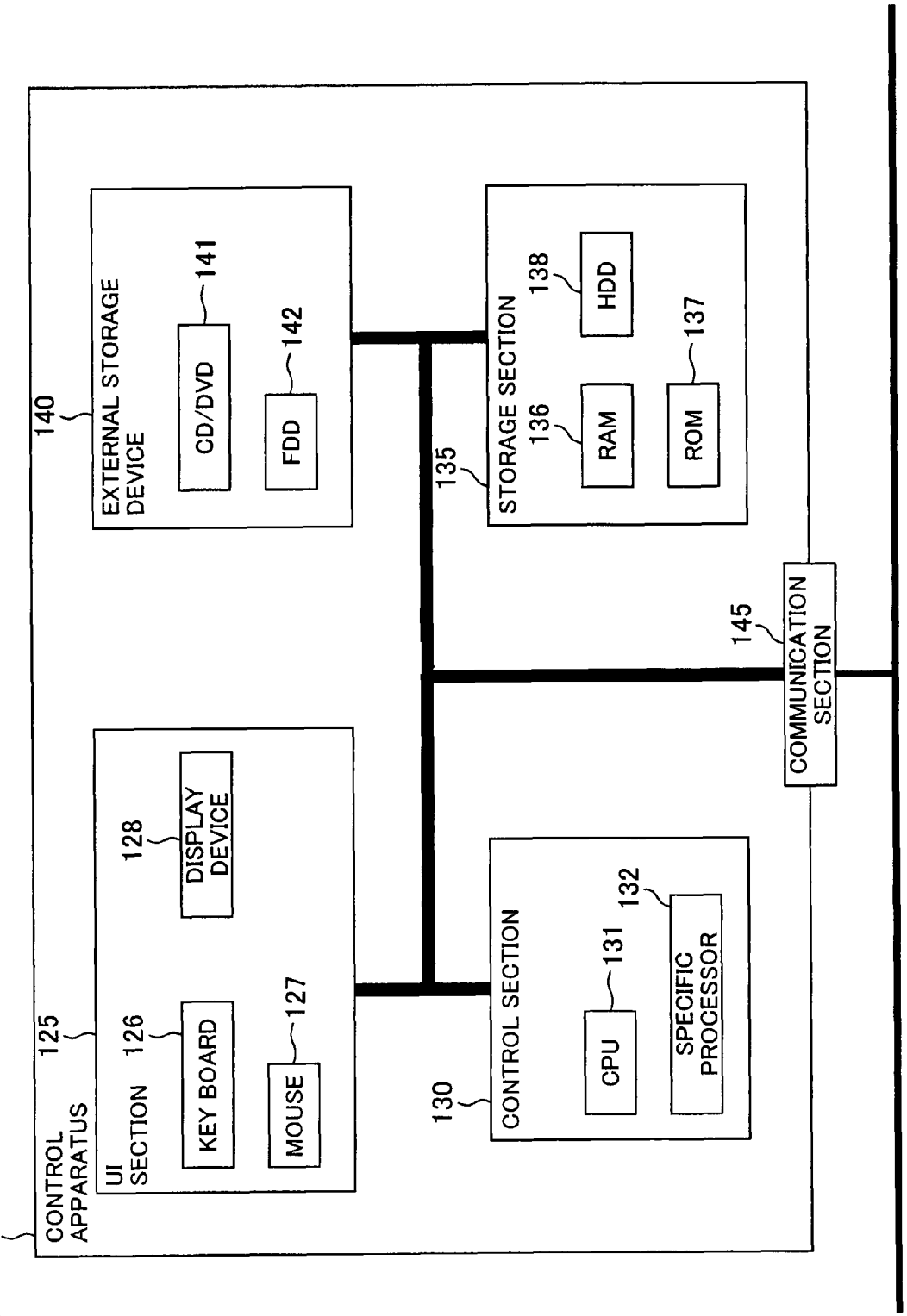
FIG. 5 is a block diagram of an embodiment of the present invention, showing a hardware structure of a control apparatus.

FIG. 5 is a block diagram showing a hardware structure of the control apparatus 2. As shown in FIG. 5, the control apparatus 2 is a computer, and includes a UI section 125, a control section 130, a storage section 135, an external storage device 140, and a communication section 145. These sections are connected with one another via data buses.

The UI section 125 receives user's inputs or informs the user of information. The UI section 125 includes a keyboard 126, a mouse 127, and a display device 128. The communication section 145 is an interface for communicating with external apparatuses such as the multifunctional apparatus 1.

The control section 130 includes a CPU 131 and a special processor 132. The storage section 135 includes a RAM 136, a ROM 137, and a HDD 138. Further, the external storage device 140 includes a CD/DVD 141 and a FDD 142.

In the control apparatus 2, the CPU 131 of the control section 130 executes programs stored in the storage section 135 so as to perform various functions. The CPU 131 executes a control program for the UI section 125 so as to perform a process for receiving information entered by the user and a process for informing the user of information. The CPU 131 executes a control program for the communication section 145 so as to perform a communication process such as transmission/reception of data. The CPU 131 executes an application program so as to perform an image process such as OCR process and a translation process.

In order to control various functions of the multifunctional apparatus 1, the control apparatus 1 may use one or more Web services provided by the multifunctional apparatus 1. The Web service is a program process allowing for externally using functions of a device via a network. In general, SOAP is used for the Web service.

On the other hand, the multifunctional apparatus 1 accesses the control apparatus 2 which is a Web server, acquires data indicative of an operation window from the control apparatus 2, and displays the operation window on the operation panel 6. That is, the multifunctional apparatus 1 can interact with a user.

Consequently, the multifunctional apparatus 1 can display the operation window only by requesting operation window data from the control apparatus 1. This makes it unnecessary for the multifunctional apparatus 1 to manage the operation window data itself.

With the structure, the system of the present embodiment for controlling a multifunctional apparatus allows the control apparatus 2 to control operations of the multifunctional apparatus 1, thereby providing a flexible system.

Further, as mentioned later, regardless of what kind the multifunctional apparatus 1 is, the multifunctional apparatus 1 has a common API (Application Program Interface) (execution instruction) which is open to outside. Consequently, the control apparatus 2 can output a common control instruction to the multifunctional apparatus 1 regardless of what kind the multifunctional apparatus 1 is. This makes it easy to develop a program to be stored in the control apparatus 2. Note that, API is a set of conventions (functions) each defining a relation between a command usable in developing software and a procedure executed by the command.

For communications regarding request/response of operation window data, the multifunctional apparatus 1 and the control apparatus 2 use HTTP or HTTPS which uses SSL (Secure Socket Layer). When HTTPS is used, it is possible to increase security. Examples of a markup language used in the communications include HTML (Hypertext Markup Language), XML (extensible Markup Language), WML (Wireless Markup Language), XHTML (extensible HyperText Markup Language), and other languages.

XML is a description language for a document structure, allowing for transmission/reception of data as easy as HTML. XML has merits such that (1) it allows a user to mark up text lines in a document, (2) it does not depend on specific software, and (3) it allows for easier programming.

On the other hand, when the control apparatus 2 controls the multifunctional apparatus 1, communications for control instructions are performed using an inter-object communication protocol (e.g. SOAP (Simple Object Access Protocol)) which uses a markup language such as XML. SOAP is a protocol based on XML, HTTP, or other languages. SOAP is used for calling data and services and is capable of associating different systems.

The following explains functional structures of the multifunctional apparatus 1 and the control apparatus 2.
(Functional Structure of Multifunctional Apparatus)

Figure 6:
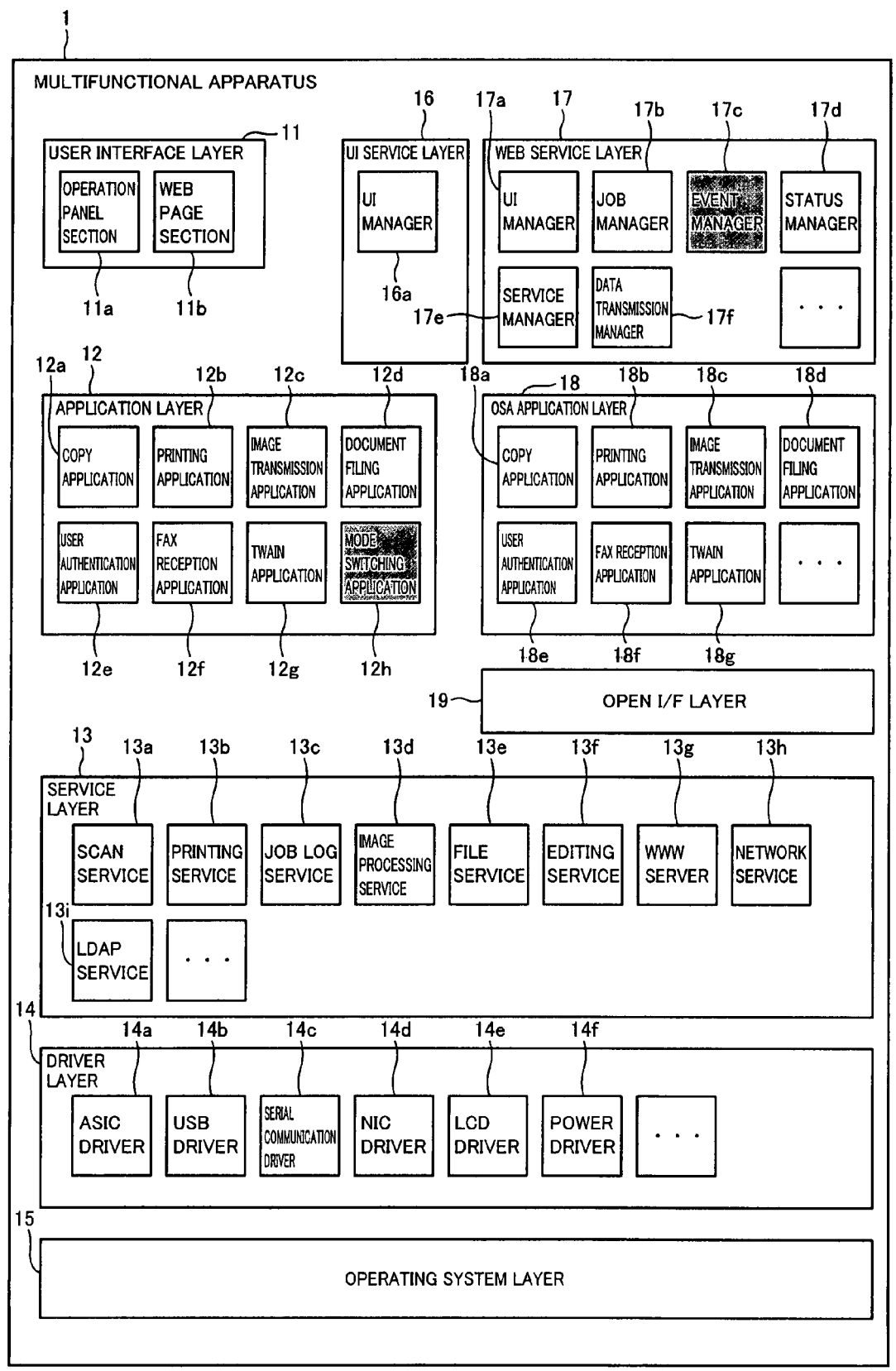
FIG. 6 is a block diagram of an embodiment of the present invention, showing a functional structure of a multifunctional apparatus.

The following explains a functional structure of the multifunctional apparatus 1. FIG. 6 is a block diagram showing a functional structure of the multifunctional apparatus 1 of the present embodiment. As shown in FIG. 6, the multifunctional apparatus 1 includes a user interface layer 11, an application layer 12, a service layer 13, a driver layer 14, an operating system layer 15, a UI service layer 16, a Web service layer 17, an OSA application layer 18, and an Open I/F layer 19. These layers and blocks included in the layers are realized by cooperation between hardware such as the control section 100 and the storage section 105 in FIG. 3 and software such as programs stored in the storage section 105.

The user interface layer 11 is an interface with which a user operates the multifunctional apparatus 1. The user interface layer 11 stores an operation window (specific operation window) specific to the multifunctional apparatus 1, and causes the operation panel 6 to display the specific operation window. The user can control the multifunctional apparatus 1 by entering execution of a desired process on the specific operation window.

An operation panel section 11a of the user interface layer 11 transmits, to the application layer 12, to the UI service layer 16, or to the Web service layer 17, pressed-hardware-button information indicating which button is pressed out of hardware buttons included in the input buttons 5 of the multifunctional apparatus 1.

A Web page section 11b of the user interface layer 11 transmits information entered on a Web page to the application layer 12 or the UI service layer 16. The information entered on the Web page includes pressed-window-button information indicating which window button is pressed.

The application layer 12 operates in accordance with an application program which performs a device process obtained by combining various element processes included in the multifunctional apparatus 1. Examples of the element processes include (1) a scan process performed by controlling the document reading section 110 in FIG. 3, (2) a printing process performed by controlling the image forming section 115, (3) various image data processes such as a smoothing process, and (4) a network process performed by controlling the communication section 120. These element processes are combined so as to perform a device process. In the present embodiment, a user instructs execution of the device process.

Examples of the device process obtained by combining element processes include: a copy process performed by combining a scan process, an image process, and a printing process; and an image transmission process performed by combining a scan process and a network process. Hereinafter, the device process and the element process are discriminated from each other.

The application layer 12 of the present embodiment includes: a copy application 12a for executing/controlling a copy process which is a device process; a printing application 12b for executing/controlling a printing process; an image transmission application 12c for executing/controlling an image transmission process in which scanned image data is transmitted to an external apparatus; a document filing application 12d for executing/controlling a document filing process; a user authentication application 12e for executing/controlling a user authentication process; a FAX reception application 12f for executing/controlling a FAX reception process; and a TWAIN application 12g for executing/controlling a TWAIN process.

Further, the application layer 12 includes a mode switching application 12h for performing a mode switching process for switching between a standard operation mode and an OS mode in accordance with information transmitted from the user interface layer 11.

The mode switching application 12h receives, from the user interface layer 11, an instruction for switching between the standard operation mode and the OS mode. In the standard operation mode, the mode switching application 12h causes the application layer 12 to operate and stops the Web service layer 17 and the OSA application layer 18 from operating. In the OS mode, the mode switching application 12h stops the application layer 12 (except for the mode switching application 12h) from operating, and causes the Web service layer 17 and the OSA application layer 18 to operate.

The service layer 13 is subordinate to the application layer 12, and executes the element processes included in the multifunctional apparatus 1 in accordance with an instruction from the application layer 12.

The service layer 13 of the present embodiment includes: a scan service 13a for performing a scan process which is one of the element processes; a printing service 13b for performing a printing process; a job log service 13c for managing information with respect to each job; an image processing service 13d for performing an image forming process such as image formation; a filing service 13e for managing images such as document filing; an editing service 13f for performing an editing process of image data; a WWW server service 13g for performing an access process via a Web page from a remote place; a network service 13h for performing a communication process through a LAN or a telephone line; an LDAP (Lightweight Directory Access Protocol) service 13i for accessing a directory data base; and other services.

The driver layer 14 is subordinate to the service layer 13, and controls hardware of the multifunctional apparatus 1 so as to perform the element processes. Each section of the service layer 13 operates in accordance with a driver program for controlling hardware included in the multifunctional apparatus 1.

The driver layer 14 of the present embodiment includes: an ASIC driver 14a for performing image formation; a USB driver 14b for performing a USB communication; a serial communication driver 14c for performing a serial communication; an NIC driver 14d for performing a LAN communication; an LCD driver 14e for controlling display of the operation panel 6; a power driver 14f for managing a power supply; and other drivers.

The operating system layer 15 is subordinate to the driver layer 14, and controls an operating system.

In a case where the mode switching application 12h of the application layer 12 selects the standard operation mode, the multifunctional apparatus 1 functions only using the user interface layer 11, the application layer 12, the service layer 13, the driver layer 14, and the operating system layer 15. The user interface layer 11, the application layer 12, the service layer 13, the driver layer 14, and the operating system layer 15 operate in accordance with software specific to the multifunctional apparatus 1 and are different with respect to each type of multifunctional apparatus. Therefore, by including these layers, the multifunctional apparatus 1 can directly receive instructions from a user without intermediation of a communication network and can function in accordance with the instructions.

However, if the multifunctional apparatus 1 includes only specific layers as described above, then the control apparatus 2 must generate control instructions with respect to each multifunctional apparatus 1 so as to control the multifunctional apparatus 1. This would complicate processes. For that reason, the multifunctional apparatus 1 of the present embodiment further includes the following layers so as to perform the OS mode in which the multifunctional apparatus 1 functions by receiving common control instructions from the control apparatus 2 provided outside.

Using HTTP (alternatively, HTTPS) the UI service layer 16 acquires operation window data from the control apparatus 2 and displays on the operation panel 6 an operation window based on the acquired operation window data. The UI service layer 16 may include a function of a commonly used Web browser.

The multifunctional apparatus 1 includes the UI service layer 16 and the user interface layer 11. This allows a user to use one of the standard operation mode and the OS (open system) mode by operating the operation window of the operation panel 6. The standard operation mode is a mode in which a function corresponding to an operation on an operation window (displayed by the user interface layer 11) specific to the multifunctional apparatus 1 is performed in the multifunctional apparatus 1. The OS mode is a mode in which a network resource (e.g. application of a remote control apparatus) is used.

The UI service layer 16 includes a UI manager 16a for controlling display of a UI (operation window) provided by the control apparatus 2.

Using HTTP (alternatively, HTTPS), the UI service layer 16 transmits transmission request information (request information) which requests operation window data from the control apparatus 2 designated by an address stored in advance by the storage section 105. The UI manager 16a causes the operation panel 6 to display an operation window based on operation window data acquired as a response. In this way, the UI manager 16a functions as UI processing means for receiving operation window data from the control apparatus 2 and causing the operation panel 6 to display an operation window indicated by the received data.

Further, using HTTP (alternatively, HTTPS), the UI manager 16a transmits, to the control apparatus 2, pressed-window-button information indicating which button is pressed out of window buttons, acquires new operation window data as a response, and causes the operation panel 6 to display an operation window indicated by the data. That is, the UI manager 16a also functions as information informing means for informing the control apparatus 2 of various information entered by the user.

The Web service layer 17 transmits a user's input to the control apparatus 2, so that the Web service layer 17 receives a control instruction transmitted from the control apparatus 2 using SOAP, and calls a suitable module of the OSA application layer 18 which module corresponds to the control instruction. Further, the Web service layer 17 generates an SOAP command indicative of information received from the OSA application layer 18 and transmits the SOAP command to the control apparatus 2. In the Web service layer 17, a control instruction is stored so as to correspond to a module of the OSA application layer 18 which module is suitable for a control indicated by the control instruction. The Web service layer 17 calls a suitable module in accordance with the stored relation.

The Web service layer 17 of the present embodiment includes a UI manager 17a for processing a Web service regarding a UI control; a job manager 17b for processing a Web service regarding a job control; an event manager 17c for informing the control apparatus 2 of pressed-hardware-button information from the user interface layer 11 and a log-in user's name stored in the storage section 105; a status manager 17d for storing the log-in user's name from the control apparatus 2 in the storage section 105 and for processing a Web service regarding controls of a job status and a device status; a service manager 17e for registering information regarding the OSA application layer 18; a data transmission/reception manager 17f for processing a Web service for transmitting/receiving job data.

The OSA application layer 18 controls the device process, and outputs, to the Open I/F layer 19, a first API (first control command) included in a control instruction from the control apparatus 2. As mentioned later, API usable (published) on the Open I/F layer 19 does not depend on the type of a multifunctional apparatus. Therefore, it is unnecessary for the OSA application layer 18 to change a program code with respect to each multifunctional apparatus.

The OSA application layer 18 of the present embodiment includes: a copy application 18a for executing/controlling a copy process; a printing application 18b for executing/controlling a printing process; an image transmission application 18c for executing/controlling an image transmission process in which scanned image data is transmitted to an external apparatus; a document filing application 18d for executing/controlling a document filing process; a user authentication application 18e for executing/controlling a user authentication process; a FAX reception application 18f for executing/ controlling a FAX reception process; a TWAIN application 18g for executing/controlling a TWAIN process; and other applications.

The Open I/F layer 19 publishes the first API for controlling the service layer 13 to the OSA application layer 18. The Open I/F layer 19 receives, from the OSA application layer 18, a first control command for calling the first API and converts the received first control command into a second control command which can be received by the service layer 13.

The Open I/F layer 19 includes a command conversion table storage section (not shown) in which a command conversion table (command relation information) is stored, the command conversion table including the first control command from the OSA application layer 18 and the second control command for calling a second API externally published by the service layer 13 so that the first control command is corresponded with the second control command. According to the conversion table, the Open I/F layer 19 calls the second API published by the service layer 13. FIG. 7 is a drawing showing an example of a command conversion table stored in the Open I/F layer 19.

In the Open I/F layer 19, the first API to be published to the OSA application layer 18 is common regardless of the types of the multifunctional apparatuses 1. Consequently, it is unnecessary to change a program code of the OSA application layer 18 and it is possible to commonly define a method published by the Web service layer 17 to external apparatuses, regardless of the types of the multifunctional apparatuses 1. That is, the control apparatus 2 can control the Web service layer 17 by using a common method regardless of the types of the multifunctional apparatuses 1.

Figure 8:
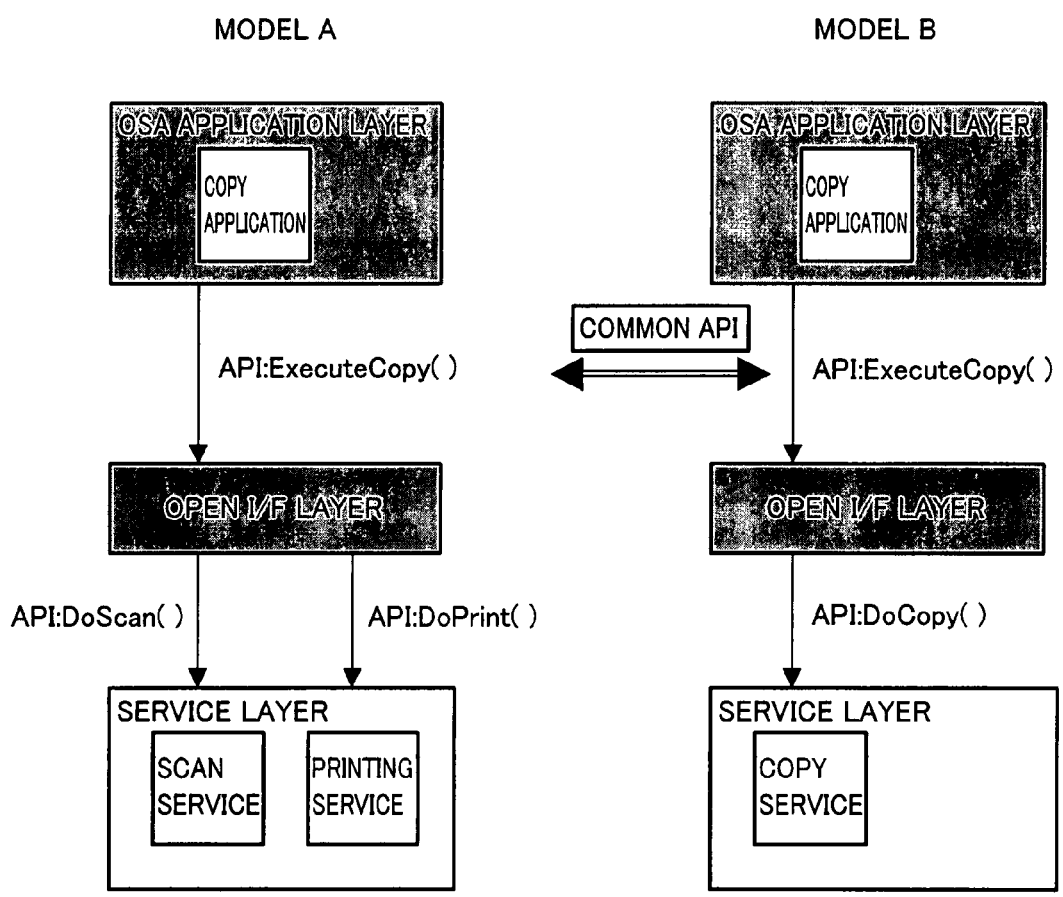
FIG. 8 is a drawing of an embodiment of the present invention, explaining a function of an Open I/F layer.

FIG. 8 is a drawing explaining a function of the Open I/F layer 19. In FIG. 8, a model A of the multifunctional apparatus 1 includes a scan service and a printing service as the service layer 13. At that time, the Open I/F layer 19 of the model A of the multifunctional apparatus 1 includes a command conversion table in which a first API (first control command) "Execute Copy" is corresponded with second APIs (second control command) "Do Scan" and "Do Print" as shown in FIG. 7. Consequently, when the Open I/F layer 19 receives the first API (first control command) "Execute Copy", the Open I/F layer 19 allows for a scan service and a printing service in accordance with the second APIs (second control command) which are obtained by converting the first API.

On the other hand, a model B of the multifunctional apparatus 1 includes a copy service as the service layer 13. At that time, the Open I/F layer 19 of the model B of the multifunctional apparatus 1 includes a command conversion table in which a first API (first control command) "Execute Copy" is corresponded with a second API (second control command) "Do Copy". Consequently, when the Open I/F layer 19 receives the first API (first control command) "Execute Copy", the Open I/F layer 19 allows for a copy service in accordance with the second API (second control command) which is obtained by converting the first API.

As described above, with the Open I/F layer 19, the control apparatus 2 and the OSA application layer 18 can instruct execution of copy by using the common API (control command) "Execute Copy". That is, even if the service layer 13 of the multifunctional apparatus 1 is different with respect to the types of the multifunctional apparatuses 1, the control apparatus 2 and the OSA application layer 18 can perform services by using the same execution instruction and the same first API (first control command). Consequently, it is unnecessary to use different execution instructions and different types of first API (first control command) with respect to the types of multifunctional apparatuses 1. This allows for easily developing a program for the control apparatus 2 and the OSA application layer 18.

Figure 9:
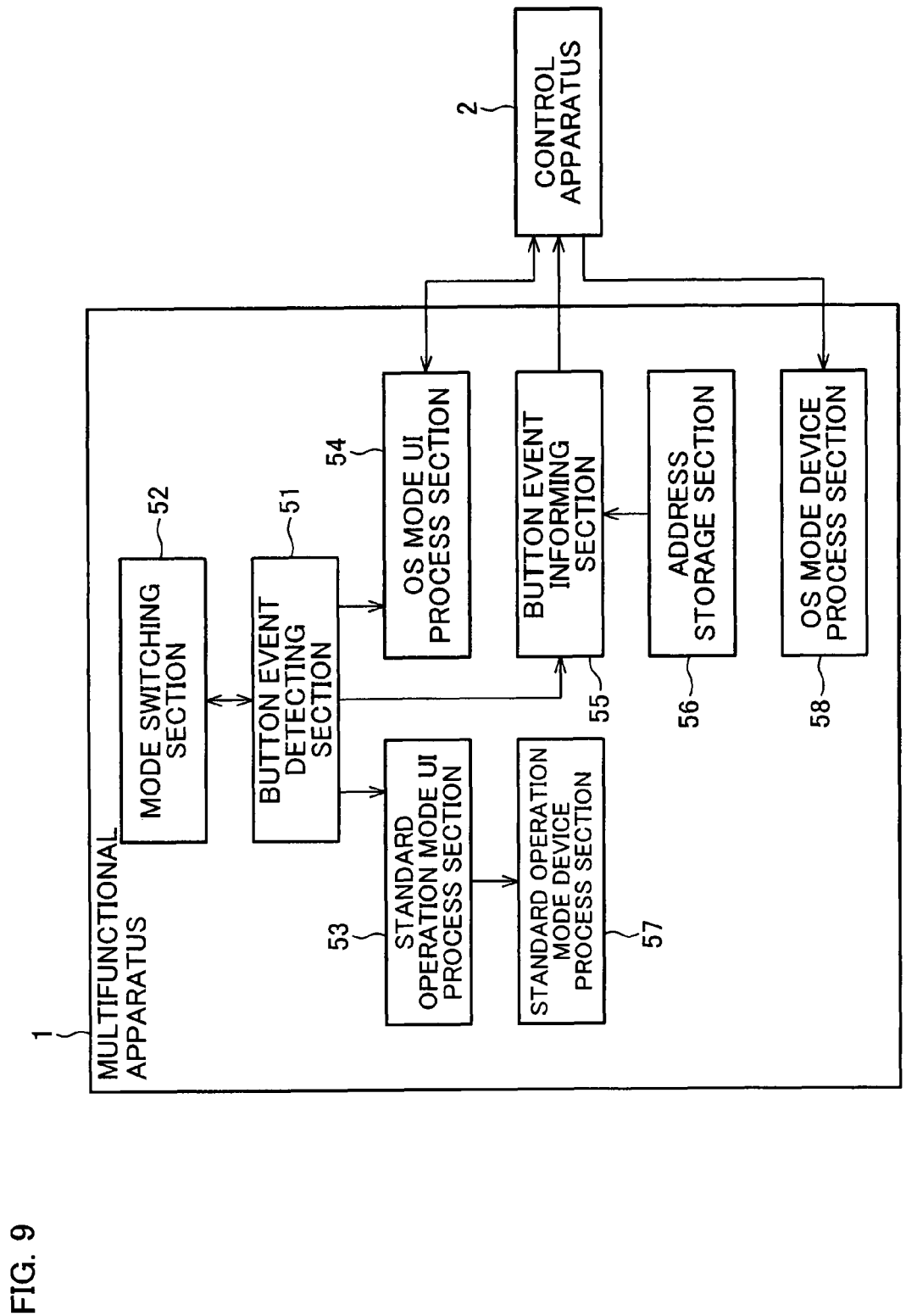
FIG. 9 is a block diagram showing a structure regarding a function for switching between a standard operation mode and an OS mode in a multifunctional apparatus.

FIG. 9 is a block diagram showing a functional block regarding a function of switching between the standard operation mode and the OS mode in the multifunctional apparatus 1. As shown in FIG. 9, in order to perform the switching function, the multifunctional apparatus 1 includes a button event detection section 51, a mode switching section 52, a standard operation mode UI process section 53, an OS mode UI process section 54, a button event informing section 55, an address storage section 56, a standard operation mode device process section 57, and an OS mode device process section 58.

The button event detecting section 51 is a block for performing a function included in the user interface layer 11. The button event detecting section 51 detects that a hardware button of the input buttons 5 is pressed and generates pressed-hardware-button information indicative of the pressed hardware button. Further, the button event detecting section 51 detects that the operation panel 6 is pressed and generates pressed-window-button information indicative of a window button displayed on a pressed position. The button event detecting section 51 outputs the pressed-hardware-button information thus generated and the pressed-window-button information thus generated to the mode switching section 52 and the standard operation mode UI process section 53 or the OS mode UI process section 54.

The mode switching section 52 is a block corresponding to the mode switching application 12h of the application layer 12. When the button event detecting section 51 detects that a mode switching button is pressed, the mode switching section 52 switches between the standard operation mode and the OS mode. The mode switching button may be a hardware button or a window button.

In switching to the OS mode, the mode switching section 52 sets the button event detecting section 51 so that the button event detecting section 51 supplies pressed-button information (pressed-hardware-button information and pressed-window-button information) to the button event informing section 55 and the OS mode UI process section 54. Then, the mode switching section 52 causes the button event informing section 55, the OS mode UI process section 54, and the OS mode device process section 58 to operate, and stops the standard operation mode UI process section 53 and the standard operation mode device process section 57 from operating. Further, in switching to the standard operation mode, the mode switching section 52 sets the button event detecting section 51 so that the button event detecting section 51 supplies the pressed-button information to the standard operation mode UI process section 53. Then, the mode switching section 52 causes the standard operation mode UI process section 53 and the standard operation mode device process section 57 to operate, and stops the button event informing section 55, the OS mode UI process section 54, and the OS mode device process section 58 from operating.

The standard operation mode UI process section 53 is a block for performing a function included in the user interface layer 11. The standard operation mode UI process section 53 causes the operation panel 6 to display a specific operation window specific to the multifunctional apparatus 1.

The OS mode UI process section 54 is a block corresponding to the UI service layer 16. The OS mode UI process section 54 transmits transmission request information for requesting operation window data to the control apparatus 2 designated by an address stored in the address storage section 56, and causes the operation panel 6 to display an operation window based on operation window data obtained as a response. Further, the OS mode UI process section 54 transmits, to the control apparatus 2, pressed-window-button information supplied from the button event detecting section 51.

The button event informing section 55 is a block corresponding to the event manager 17c of the Web service layer 17. In the OS mode, the button event informing section 55 informs the control apparatus 2 designated by an address stored in the address storage section 56 of pressed-hardware-button information supplied from the button event detecting section 51.

The address storage section 56 corresponds to a part of a storage area of the storage section 105, and stores an address of the control apparatus 2. FIG. 10 is an example of an address stored in the address storage section 56. The address storage section 56 may store a UNC (Universal Naming Convention) path or the like instead of an address shown in FIG. 10.

The standard operation mode device process section 57 is a block corresponding to the application layer 12 (except for the mode switching application 12h), the service layer 13, and the driver layer 14. The standard operation mode device process section 57 performs a device process corresponding to pressed-button information from the button event detecting section 51. The standard operation mode device process section 57 performs a predetermined process specific to the multifunctional apparatus 1 with respect to each hardware button indicated by pressed-hardware-button information. That is, when the start button 5a is pressed, the standard operation mode device process section 57 starts a copy process. When a ten key is pressed, the standard operation mode device process section 57 sets print number. When the clear button 5d is pressed, the standard operation mode device process section 57 restores setting conditions to default conditions. The standard operation mode device process section 57 stores information of a process specific to the multifunctional apparatus 1, in which information each hardware button is corresponded with a device process. The standard operation mode device process section 57 performs a device process based on the information.

The OS mode device process section 58 is a block for performing functions included in the Web service layer 17 (except for the event manager 17c), the OSA application layer 18, the service layer 13, and the driver layer 14. The OS mode device processing section 58 performs a device process in accordance with a control instruction from the control apparatus 2.

(Structure of Control Apparatus)

Figure 11:
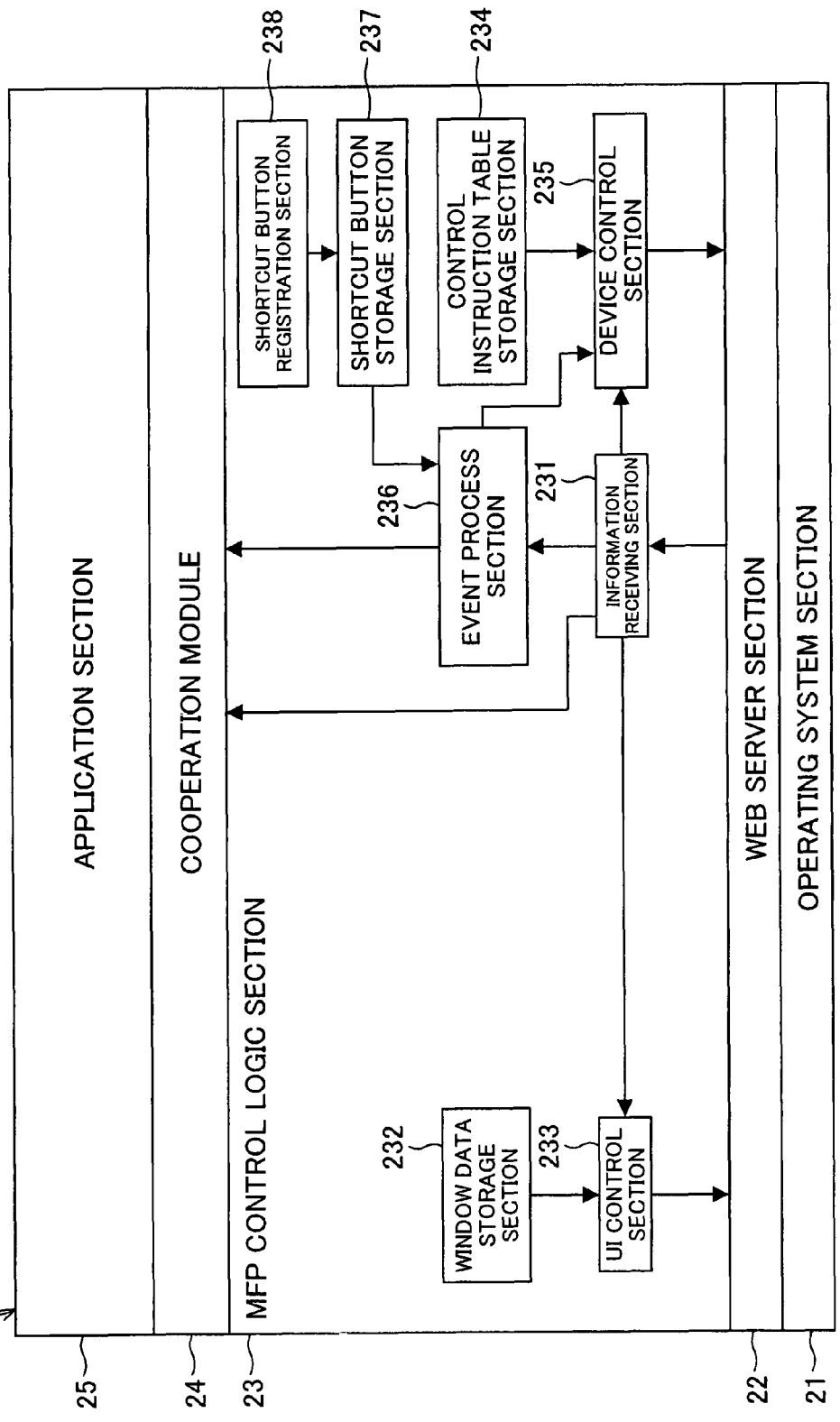
FIG. 11 is a block diagram of an embodiment of the present invention, showing a functional structure of a control apparatus.

FIG. 11 is a block diagram showing a functional structure of the control apparatus 2 of the present embodiment. As shown in FIG. 11, the control apparatus 2 includes an operating system section 21, a Web server section 22, an MFP control logic section 23, a cooperation module 24, and an application section 25. These sections are realized by a corporation between hardware including the control section 130 and the storage section 135 in FIG. 5 and software including a program stored in the storage section 135.

The operating system section 21 is a block for performing a process based on an operating system (OS) which manages a computer system and provides a basic user operating environment. Examples of OS include Windows (registered trademark) and Linux.

The Web server section 22 performs a communication using HTTP (hypertext transfer protocol) (alternatively, HTTPS) or SOAP (simple object access protocol). The Web server section 22 receives an HTTP request from the multifunctional apparatus 1 and transmits an HTTP response which responds to the HTTP request. The Web server section 22 is a block which operates in accordance with software such as Apache.

The MFP control logic section 23 controls display of an operation window (UI) of the multifunctional apparatus 1 and controls execution of device processes of the multifunctional apparatus 1. The MFP control logic section 23 includes an information receiving section 231, a window data storage section 232, a UI control section 233, a control instruction table storage section 234, a device control section 235, an event process section 236, a shortcut button storage section 237, and a shortcut button registration section 238.

The window data storage section 232 stores data of operation windows displayed on the operation panel 6 of the multifunctional apparatus 1.

The UI control section 233 reads out operation window data from the window data storage section 232 in response to an instruction from the information receiving section 231, and outputs the operation window data to the multifunctional apparatus 1 via the Web server section 22. The UI control section 233 transmits the operation window data to the multifunctional apparatus 1 by using HTTP (alternatively, HTTPS).

The control instruction table storage section 234 stores a control instruction table in which the kind of a device process to be performed by the multifunctional apparatus 1 is corresponded with one or more control instructions (including execution instructions) for performing the device process, which instructions can be received by the multifunctional apparatus 1.

FIG. 12 is a drawing showing an example of a control instruction table. As shown in FIG. 12, in the control instruction table, for example, the kind of a device process "scan" is corresponded with control instructions (execution instructions) "JobCreate", "ExecuteScan", and "JobClose" for the device process. Further, for a process corresponding to a plurality of control instructions, the order of outputting the control instructions is also stored in the control instruction table.

As mentioned later, control instructions stored in the control instruction table are groups of first control commands each for calling an API (first API) externally published by the Open I/F layer 19 of the multifunctional apparatus 1. These commands are common commands which are not dependent on what type the multifunctional apparatus 1 is.

The device control section 235 reads out a control instruction for the multifunctional apparatus 1 from the control instruction table storage section 234 in response to an instruction from the information receiving section 231 or the event process section 236, and transmits the control instruction to the multifunctional apparatus 1 via the Web server section 22. The device control section 235 transmits the control instruction to the multifunctional apparatus 1 by using SOAP.

The control instruction transmitted by the device control section 235 commands the multifunctional apparatus 1 to perform device processes which can be performed by the multifunctional apparatus 1. When the multifunctional apparatus 1 receives the control instruction, the multifunctional apparatus 1 causes the CPU 101 to execute a program corresponding to the control instruction, thereby performing device processes of the multifunctional apparatus 1. For that reason, the control instruction transmitted by the device control section 235 may be considered as an execution instruction for instructing the multifunctional apparatus 1 to execute a program.

The information receiving section 231 receives, via the Web server section 22, information transmitted by the multifunctional apparatus 1, and instructs the UI control section 233, the application section 25, and the device control section 235 to perform a process corresponding to the information. Examples of the information which the information receiving section 231 receives from the multifunctional apparatus 1 include (a) a request for transmission of operation window data, (b) pressed-window-button information (and input information inputted on a window (information such as log-in information)), (c) pressed-hardware-button information and user identification information, and (d) a completion notice which is transmitted from the multifunctional apparatus 1 after a process has been performed in the multifunctional apparatus 1.

Examples of the operation window requested by the request (a) include: an initial menu window allowing a user to select a cooperation process which is performed by cooperation between the multifunctional apparatus and the control apparatus; a log-in window for a user authentication; a scan execution window for urging execution of scan; and a shortcut button pressing instruction window. When the information receiving section 231 receives the request (a), the information receiving section 231 instructs the UI control section 233 to transmit operation window data corresponding to the request (a).

Examples of the information (b) include: pressed-window-button information indicating that an item button displayed on the initial menu window is pressed; pressed-window-button information indicating that an OK button displayed on the scan execution window is pressed; pressed-window-button information indicating that an OK button displayed on the log-in window is pressed; and log-in information including a log-in user's name and a password inputted on the log-in window. When the information receiving section 231 receives the information (b), the information receiving section 231 instructs the device control section 235 to transmit a control instruction or instructs the application section 25 to execute a program in accordance with the received information (b).

For example, when the information receiving section 231 receives pressed-window-button information indicating that an OK button displayed on the scan execution window is pressed, the information receiving section 231 instructs the device control section 235 to transmit a control instruction for a scan process to the multifunctional apparatus 1.

For another example, when the information receiving section 231 receives pressed-window-button information indicating that an OK button displayed on the log-in window is pressed and log-in information, the information receiving section 231 instructs the UI control section 233 to transmit operation window data indicative of "logging in" to the multifunctional apparatus 1, and instructs the application section 25 to execute an authentication application.

Further, when the information receiving section 231 receives the information (c) after instructing the UI control section 233 to transmit operation window data indicative of a shortcut button pressing instruction window, the information receiving section 231 outputs the pressed-hardware-button information and the user identification information to the event process section 236.

Further, when the information receiving section 231 receives the notice (d), the information receiving section 231 instructs the event process section 236 or the device control section 235 to transmit a control instruction for a subsequent process to the multifunctional apparatus 1.

The information receiving section 231 performs these instructions based on an event table stored in the storage section 135. FIG. 13 is a drawing showing a part of the event table. As shown in FIG. 13, the event table includes (i) information received by the information receiving section 231, (ii) information indicative of a block to be instructed to execute a process at a time when the information (i) is received, and (iii) information indicative of contents of the process.

In the shortcut button storage section 237, hardware button identification information by which a hardware button is identified and a series of processes performed by the multifunctional apparatus 1 or the application section 25 are stored so that the hardware button identification information corresponding to the series of processes with respect to each log-in user's name. FIG. 14 is a drawing showing an example of information stored in the shortcut button storage section 237. As shown in FIG. 14, the shortcut button storage section 237 stores shortcut information in which: a hardware button's name, the number of processes to be performed by the multifunctional apparatus 1 or the application section 25, the order of executing processes, and process-contents information indicative of contents of a process are corresponded with one another with respect to each log-in user's name.

Examples of the process-contents information include: processing apparatus information indicating whether the process is performed by the multifunctional apparatus 1 or the application section 25 of the control apparatus 2; process-type information indicating what type the process is; and output data format information indicating a format of image data outputted in the process. Process-contents information in execution order 1 may include input data information indicative of an input data's name and a location where the input data is stored. In FIG. 14, processing apparatus information "image processing apparatus" indicates the multifunctional apparatus 1, and processing apparatus information "computer" indicates the application section 25 of the control apparatus 2.

In a case of a process performed by the multifunctional apparatus 1, the process-type information is device process information by which a device process is identified (a device process's name (e.g. "scan") in FIG. 14). In a case of a process performed by the control apparatus 2, the process-type information is program information by which an application program is identified (a program's name (e.g. "OCR.exe") in FIG. 14). Further, the program information includes parameters necessary for executing application programs. A user registers these parameters in advance.

The event process section 236 reads out a series of process-contents information from the shortcut button storage section 237 in the order of executing processes, the series of process-contents information being corresponded with (i) a hardware button indicated by pressed-hardware-button information supplied from the information receiving section 231 and (ii) a log-in user's name supplied from the information receiving section 231. Then, the event process section 236 supplies an instruction based on the process-contents information to the device control section 235 or the application section 25. As a result, an event process corresponding to the hardware button is performed. The event process section 236 does not need operational inputs from a user when the event process section 236 supplies an instruction based on process-contents information stored in the shortcut button storage section 237. This is more convenient for a user. That is, a hardware button indicated by button identification information stored in the shortcut button storage section 237 is regarded as a shortcut button to which an event process is related in the OS mode.

The shortcut button registration section 238 stores new shortcut information in the shortcut button storage section 237 or edits already registered shortcut information in accordance with information supplied to the UI section 125 in FIG. 5.

(Outline of Operation of System for Controlling Multifunctional Apparatus in OS Mode)

The following explains an outline of an operation of a system for controlling a multifunctional apparatus in a case where a user selects an OS mode of the multifunctional apparatus 1. Since a standard operation mode of the multifunctional apparatus 1 is identical with that of a conventional multifunctional apparatus, an explanation as to processes in the standard operation mode will be omitted in the present specification. Further, the multifunctional apparatus 1 is designed to be in the standard operation mode when the multifunctional apparatus 1 is started.

Figure 15:
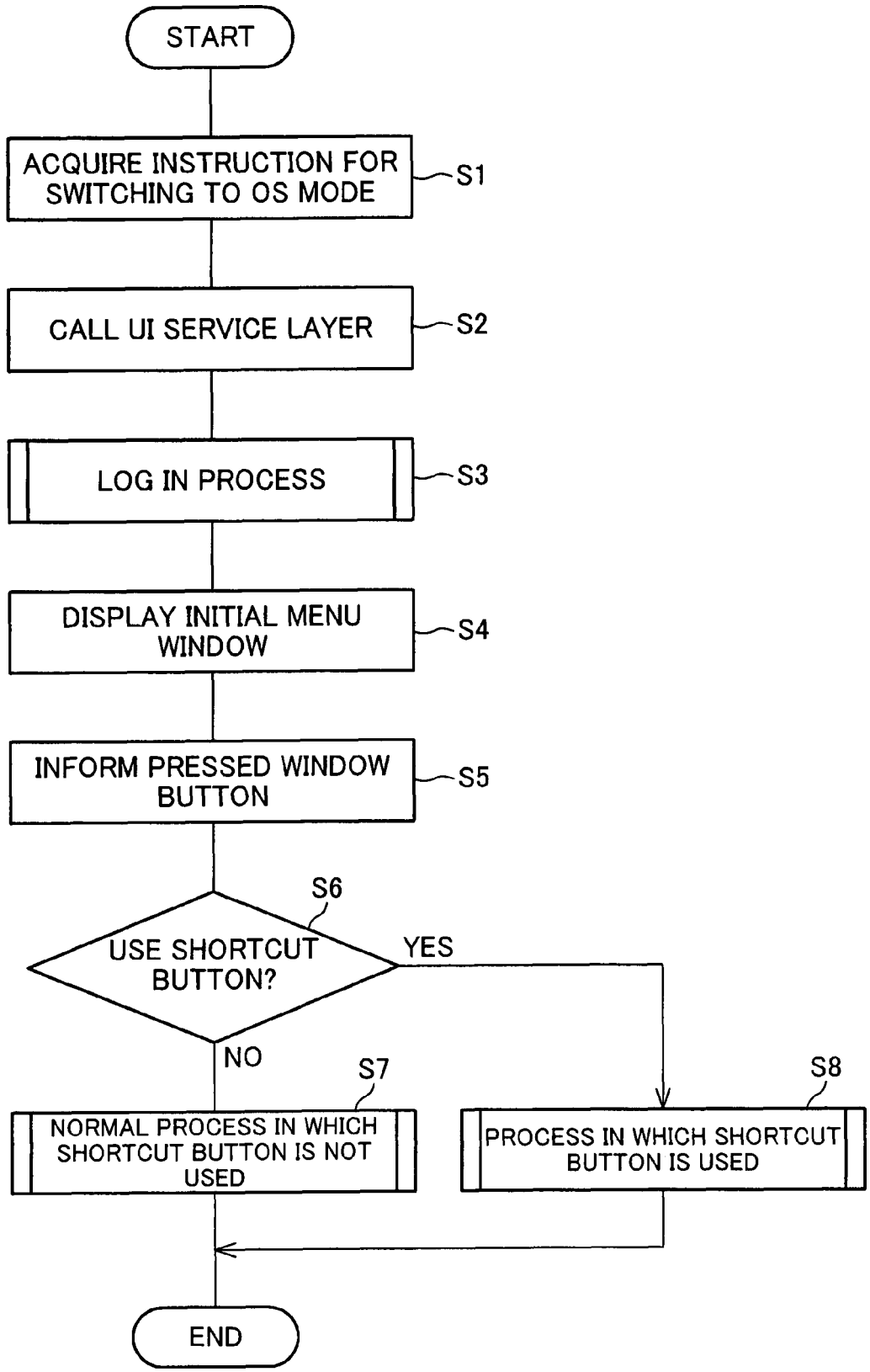
FIG. 15 is a flowchart showing a function of a system for controlling a multifunctional apparatus at a time when a user selects an OS mode in the multifunctional apparatus.

As shown in FIG. 15, in the multifunctional apparatus 1, the mode switching application 12h of the application layer 12 receives an instruction indicative of switching to the OS mode (S1), and causes the UI service layer 16 to function (calls the UI service layer 16) (S2).

Next, a log-in process for a user who is using the multifunctional apparatus 1 is performed (S3). Here, authentication of the user is not performed by the multifunctional apparatus 1 but performed by the control apparatus 2.

After authentication of the user, the UI control section 233 of the control apparatus 2 reads out data indicative of an initial menu window from the window data storage section 232, and transmits the data to the multifunctional apparatus 1. On the initial menu window, a list of process item buttons indicative of process items which can be selected by the user and registered process selecting buttons indicative of shortcut buttons having been registered in the shortcut button storage section 237 are displayed.

Examples of the process items include device processes of the multifunctional apparatus 1 and cooperation processes in which the device processes are combined with executions of application programs of the control apparatus 2. Examples of the device processes include a "scan process" and examples of the cooperation processes include an "English-Japanese translation printing process" in which designated image data is subjected to an OCR process and an English-Japanese translation process performed by an application program of the control apparatus 2 and then the data is printed by the multifunctional apparatus 1.

The UI manager 16a of the multifunctional apparatus 1 receives data indicative of the initial menu window and causes the operation panel 6 to display the initial menu window indicated by the data (S4). The user presses a desired window button on the initial menu window. As a result, the UI manager 16a of the multifunctional apparatus 1 receives, from the user interface layer 11, pressed-window-button information indicative of the window button pressed by the user.

Next, the UI manager 16a of the multifunctional apparatus 1 transmits the pressed-window-button information to the information receiving section 231 of the control apparatus 2, thereby informing the window button selected by the user (S5). Then, the information receiving section 231 judges whether the window button information transmitted from the multifunctional apparatus 1 is indicative of a registered process selecting button or not (S6). That is, it is judged whether a shortcut button is to be used or not.

When the window button information is not indicative of a registered process selecting button, a process for a case of not using a shortcut button is performed (S7). When the window button information is indicative of a registered process selecting button, a process for a case of using a shortcut button is performed (S8).

The following details operations in S3, S7, and S8.

(Log-In Process)

First, the following details a log-in process in the step S3.

Figure 16:
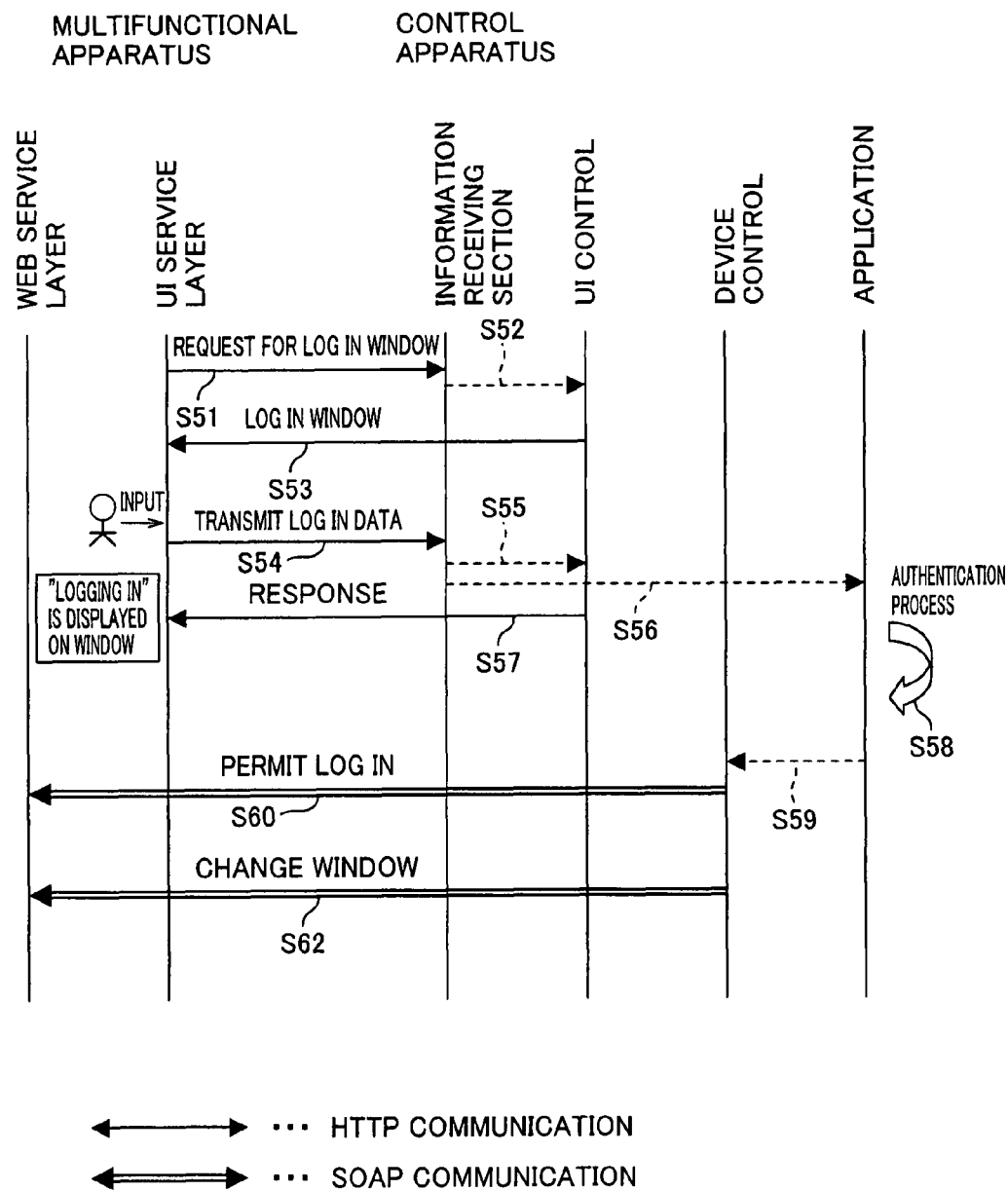
FIG. 16 is a drawing showing timings of a log-in process in an embodiment of the present invention.

In the system of the present embodiment for controlling a multifunctional apparatus, a log-in process is performed by cooperation between the multifunctional apparatus 1 and an authentication application of the control apparatus 2. That is, as described above, the control apparatus 2 performs an authentication process for judging whether a user is a valid user or not based on log-in information entered by the user in the multifunctional apparatus 1. FIG. 16 is a timing chart showing a log-in process in the present embodiment.

First, in the multifunctional apparatus 1, the UI manager 16a of the UI service layer 16 transmits, to the control apparatus 2, a request for transmission of log-in window data (S51).

When the control apparatus 2 receives the request, the information receiving section 231 instructs the UI control section 233 to transmit the log-in window data to the multifunctional apparatus 1 (S52), and the UI control section 233 searches the log-in window data stored in the window data storage section 232 and transmits the log-in window data to the multifunctional apparatus 1 (S53).

In the multifunctional apparatus 1, the UI manager 16a of the UI service layer 16 causes a log-in window to be displayed based on the received window data.

Seeing the log-in window, the user inputs log-in information (log-in user's name and password) on the operation panel 6, and presses an OK button on the log-in window. Receiving the input by the user, the UI manager 16a transmits, to the control apparatus 2, the input log-in information and pressed-window-button information indicating that the OK button on the log-in window is pressed (S54).

Next, when the information receiving section 231 of the control apparatus 2 receives the pressed-window-button information, the information receiving section 231 refers to an event table shown in FIG. 13 and instructs the UI control section 233 to transmit, to the multifunctional apparatus 1, data indicative of an information window on which "logging-in" is displayed (S55), while instructing the application section 25 to call an authentication application (S56).

As a result, the UI control section 233 reads out, from the window data storage section 232, the data indicative of the information window on which "logging-in" is displayed, and transmits the data to the multifunctional apparatus 1 (S57). The UI manager 16a of the multifunctional apparatus 1 receives the data indicative of the information window and causes the operation panel 6 to display the information window indicated by the received data.

On the other hand, in accordance with the instruction in S56, the application section 25 performs an authentication process for a user (S58), the authentication process being performed based on an authentication application program and by using an authentication database which has been registered in advance.

After the user is authenticated, the application section 25 instructs the device control section 235 to transmit, to the multifunctional apparatus 1, an authentication notice indicating that the user is authenticated (S59). In accordance with the instruction, the device control section 235 transmits, to the multifunctional apparatus 1, the authentication notice to which the log-in user's name is added (S60). When the Web service layer 17 of the multifunctional apparatus 1 receives the authentication notice, the Web service layer 17 stores the log-in user's name in the storage section 105 (see FIG. 3).

Further, the device control section 235 transmits, to the multifunctional apparatus 1, a control instruction for changing an operation window (S62). In response to the control instruction, the device control section 235 instructs requesting for data indicative of an initial menu window.

On the other hand, when the user is not authenticated in the step S58, an error window indicating that the user is not authenticated is displayed on the operation panel 6 of the multifunctional apparatus 1.

SOAP is used for data communications in the steps S60 and S62.

(Operation of System for Controlling Multifunctional Apparatus in Case where Shortcut Button is Not Used)

The following explains an operation of a normal process in which a shortcut button is not used when any process item button is pressed in the initial menu window (S5).

After acquiring the pressed-window-button information in S4, the information receiving section 231 refers to an event table in FIG. 13 and instructs the UI control section 233, the device control section 235, or the application section 25 to perform a process corresponding to the acquired pressed-window-button information.

Figure 17:
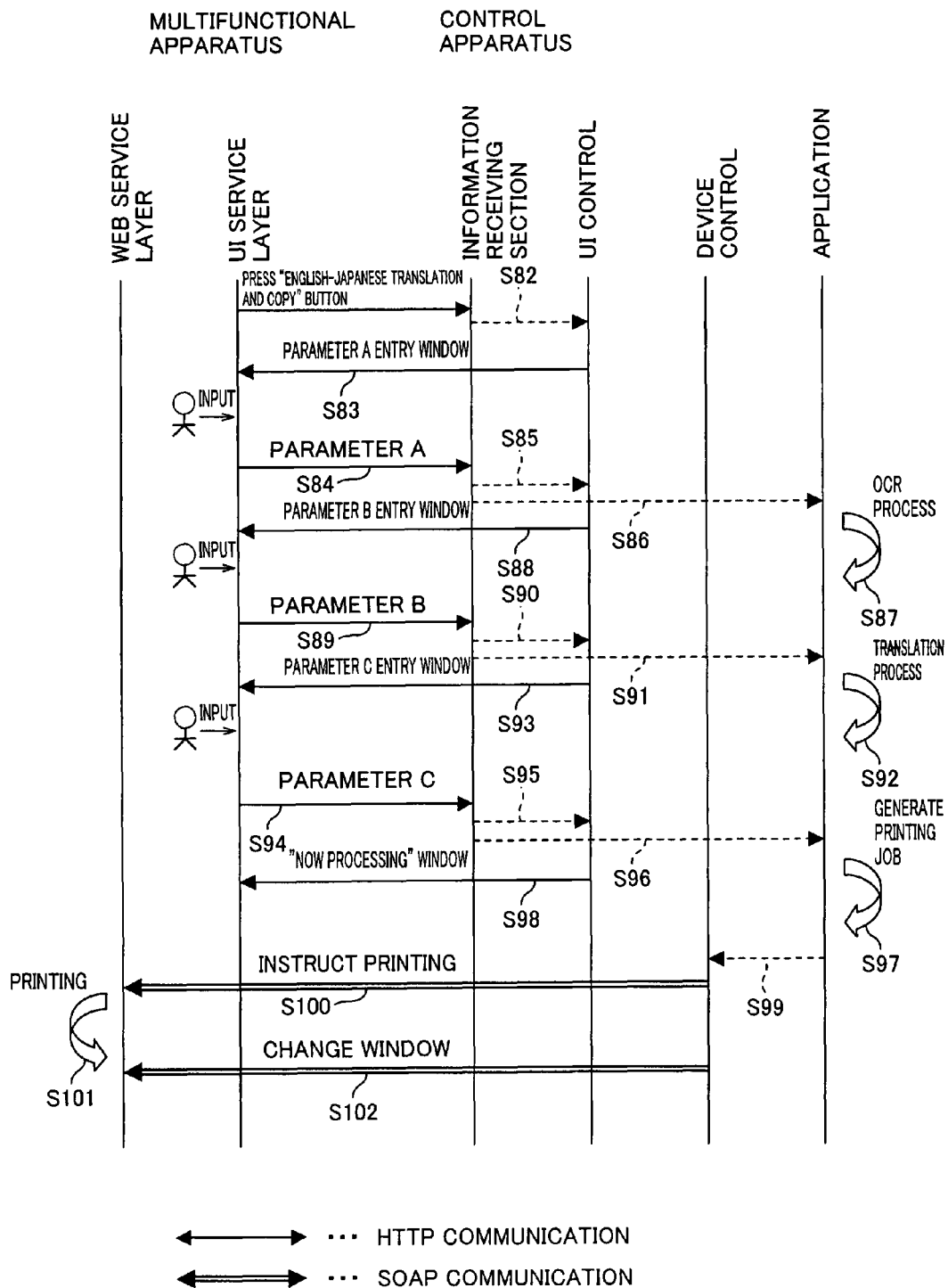
FIG. 17 is a drawing showing timings of processes performed by a multifunctional apparatus and a control apparatus at a time when an item button for an English-Japanese translation printing process is pressed.

Here, an explanation will be made as to the operation with reference to a timing chart in FIG. 17, using, as an example, a case where a process item button indicative of an "English-Japanese translation and copying" process in the initial menu window is pressed.

The information receiving section 231 refers to the event table and designates operation window data indicative of a parameter A entry window for an OCR process and instructs the UI control section 233 to transmit the operation window data (S82). The UI control section 233 reads out the designated operation window data from the storage section 232, and transmits the designated operation window data to the multifunctional apparatus 1 by using HTTP (S83).

Then, in the multifunctional apparatus 1, the UI manager 16*a* of the UI service layer 16 causes the operation panel 6 to display the parameter A entry window for the OCR process based on the received operation window data. When a user enters a parameter A and presses an OK button on the parameter A entry window, the UI manager 16*a* transmits, to the control apparatus 2, the entered parameter A and pressed-window-button information indicating that the OK button is pressed (S84). The parameter A includes a data name of image data to be translated and a location where the data is stored.

Then, in the control apparatus 2, the information receiving section 231 reads out, from the event table in FIG. 13, a process corresponding to the window button indicated by the received pressed-window-button information, and supplies predetermined instructions to the UI control section 233 and the application section 25. That is, the information receiving section 231 designates operation window data indicative of a parameter B entry window for a translation process and instructs the UI control section 233 to transmit the operation window data (S85). Further, the information receiving section 231 instructs the application section 25 to execute an OCR application (S86).

Then, the application section 25 starts the OCR application and causes the OCR application to perform an OCR process based on the parameter A transmitted from the multifunctional apparatus 1 in S84 (S87).

Further, along with the OCR process, the UI control section 233 reads out, from the window data storage section 232, the operation window data indicative of the parameter B entry window for the translation process, and transmits the operation window data to the multifunctional apparatus 1 (S88). In the multifunctional apparatus 1, the parameter B entry window is displayed.

The user enters the parameter B on the parameter B entry window for the translation process, and presses an OK button on the parameter B entry window. As a result, the UI manager 16*a* transmits, to the control apparatus 2, the entered parameter B and pressed-window-button information indicating that the OK button is pressed (S89).

Next, in the control apparatus 2, the information receiving section 231 reads out, from the event table in FIG. 13, a process corresponding to the window button indicated by the received pressed-window-button information, and supplies predetermined instructions to the UI control section 233 and the application section 25. That is, the information receiving section 231 designates operation window data indicative of a parameter C entry window for a printing process, and instructs the UI control section 233 to transmit the operation window data (S90). Further, the information receiving section 231 instructs the application section 25 to execute a translation application (S91).

Thereafter, the application section 25 starts the translation application and causes the translation application to perform, based on the parameter B transmitted from the multifunctional apparatus 1, a translation process for translating text data having been subjected to the OCR process (S92).

Along with the translation process, the UI control section 233 reads out the operation window data indicative of the parameter C entry window for the printing process, and transmits the operation window data to the multifunctional apparatus 1 (S93). In the multifunctional apparatus 1, the parameter C entry window is displayed.

The user enters the parameter C on the parameter C entry window for the printing process and presses an OK button on the parameter C entry window. As a result, the UI manager 16*a* transmits, to the control apparatus 2, the entered parameter C and pressed-window-button information indicating that the OK button is pressed (S94).

Next, in the control apparatus 2, the information receiving section 231 reads out, from the event table in FIG. 13, a process corresponding to the window button indicated by the received pressed-window-button information, and supplies predetermined instructions to the UI control section 233 and the application section 25. That is, the information receiving section 231 designates operation window data indicative of an operation window on which "now printing" is displayed, and instructs the UI control section 233 to transmit the operation window data (S95). Further, the information receiving section 231 instructs the application section 25 to execute a printing job generating application (S96).

The application section 25 starts the printing job generating application, and causes the printing job generating application to generate, based on the parameter C transmitted from the multifunctional apparatus 1, a printing job for printing a document including translated text data (S97).

Along with the generation of the printing job, the UI control section 233 reads out, from the window data storage section 232, the operation window data indicative of the operation window on which "now printing" is displayed, and transmits the operation window data to the multifunctional apparatus 1 (S98). In the multifunctional apparatus 1, the operation window is displayed.

After the generation of the printing job, the application section 25 instructs the device control section 235 to output a control instruction for a device process name "printing" (S99). The device control section 235 reads out, from the control instruction table storage section 234, the control instruction for the device process name "printing", and transmits the control instruction to the multifunctional apparatus 1 by using SOAP (S100). At that time, the device control section 235 transmits the printing job as well as the control instruction.

In the multifunctional apparatus 1, a job manager of the Web service layer 17 receives the control instruction and calls the print application 18b of the OSA application layer 18. The print application 18b performs printing by using an appropriate module (such as a printing service and an image processing service) in the service layer 13 (S101).

Further, the device control section 235 transmits, to the multifunctional apparatus 1, a control instruction for switching to the initial menu window (S102). In the multifunctional apparatus 1, based on the received control instruction, the UI manager 17a of the Web service layer 17 transmits, to the UI manager 16a of the UI service layer 16, the instruction for switching to the initial menu window. Consequently, the UI manager 16a of the UI service layer 16 changes the window on the operation panel 6 to the initial menu window.

(Operation of System for Controlling Multifunctional Apparatus in Case where Shortcut Button is Used)

Figure 2:
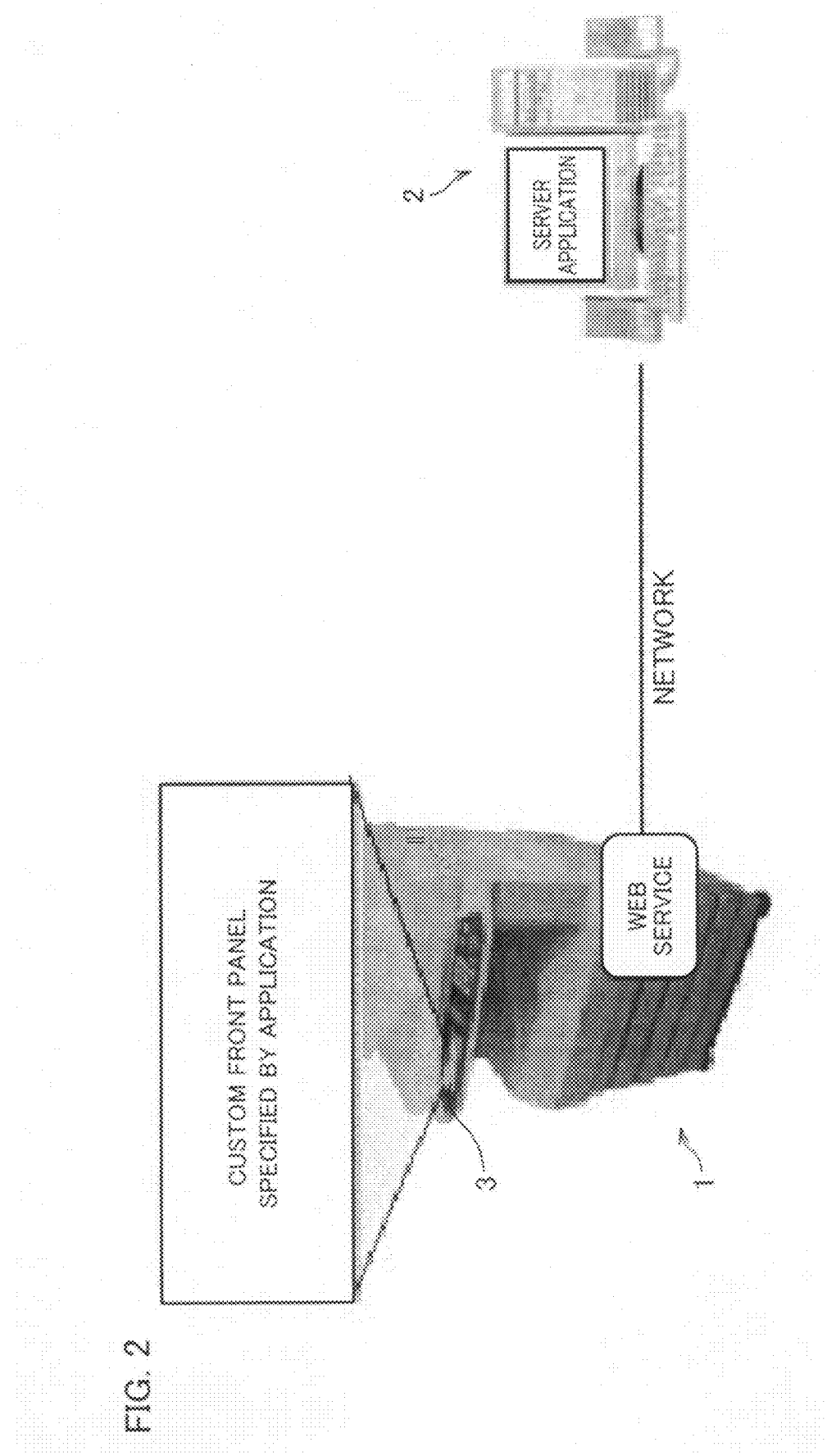
FIG. 2 is a drawing schematically showing a structure of a system of an embodiment of the present invention for controlling a multifunctional apparatus.

With reference to FIG. 1, the following explains a process in which a shortcut button is used when a registered process selection button is pressed in the initial menu window (S8).

Before the process in which a shortcut button is used, the user has registered shortcut information in the control apparatus 2. The registration is performed by the shortcut button registration section 238 of the control apparatus 2. That is, the shortcut button registration section 238 causes the display device 128 (see FIG. 5) of the control apparatus 2 to display a registration window shown in FIG. 18, and receives shortcut information via the keyboard 126 or the mouse 127. The shortcut button registration section 238 causes the user's name to correspond to the entered shortcut information, and stores the user's name and the shortcut information in the shortcut button storage section 237.

As shown in FIG. 1, the information receiving section 231 acquires the pressed-window-button information indicating that the registered process selecting button is pressed. Next, the information receiving section 231 refers to the event table in FIG. 13 and designates operation window data indicative of an operation window on which "press a shortcut button" is displayed (the operation window may be referred to as a "shortcut button pressing instruction window" hereinafter), and instructs the UI control section 233 to transmit the operation window data (S11).

The UI control section 233 reads out the operation window data from the window data storage section 232 and transmits the operation window data to the multifunctional apparatus 1 (S12). The multifunctional apparatus 1 displays the shortcut button pressing instruction window on which "press a shortcut button" is displayed.

Next, confirming the shortcut button pressing instruction window, the user presses a hardware button out of the input buttons 5 which hardware button has been registered beforehand in the control apparatus 2. The user interface layer 11 transmits pressed-hardware-button information indicative of the pressed hardware button to the event manager 17c of the Web service layer 17 (S13). The event manager 17c reads out the address of the control apparatus 2 from the storage section 105 (the address storage section 56 in FIG. 9), and reads out the log-in user's name from the storage section 105. Then, the event manager 17c informs the control apparatus 2 having an address read out from the storage section 105 about the pressed-hardware-button information transmitted from the user interface layer 11 and the log-in user's name read out from the storage section 105 (S14).

Thereafter, in the control apparatus 2 and the multifunctional apparatus 1, an event process corresponding to the pressed shortcut button is performed (S15).

Then, the user enters an instruction for switching to the standard operation mode in the multifunctional apparatus 1. The mode switching application 12h of the application layer 12 acquires the instruction (S16). Thereafter, the mode switching application 12h ends the operation of the UI service layer 16 (S17).

Figure 19:
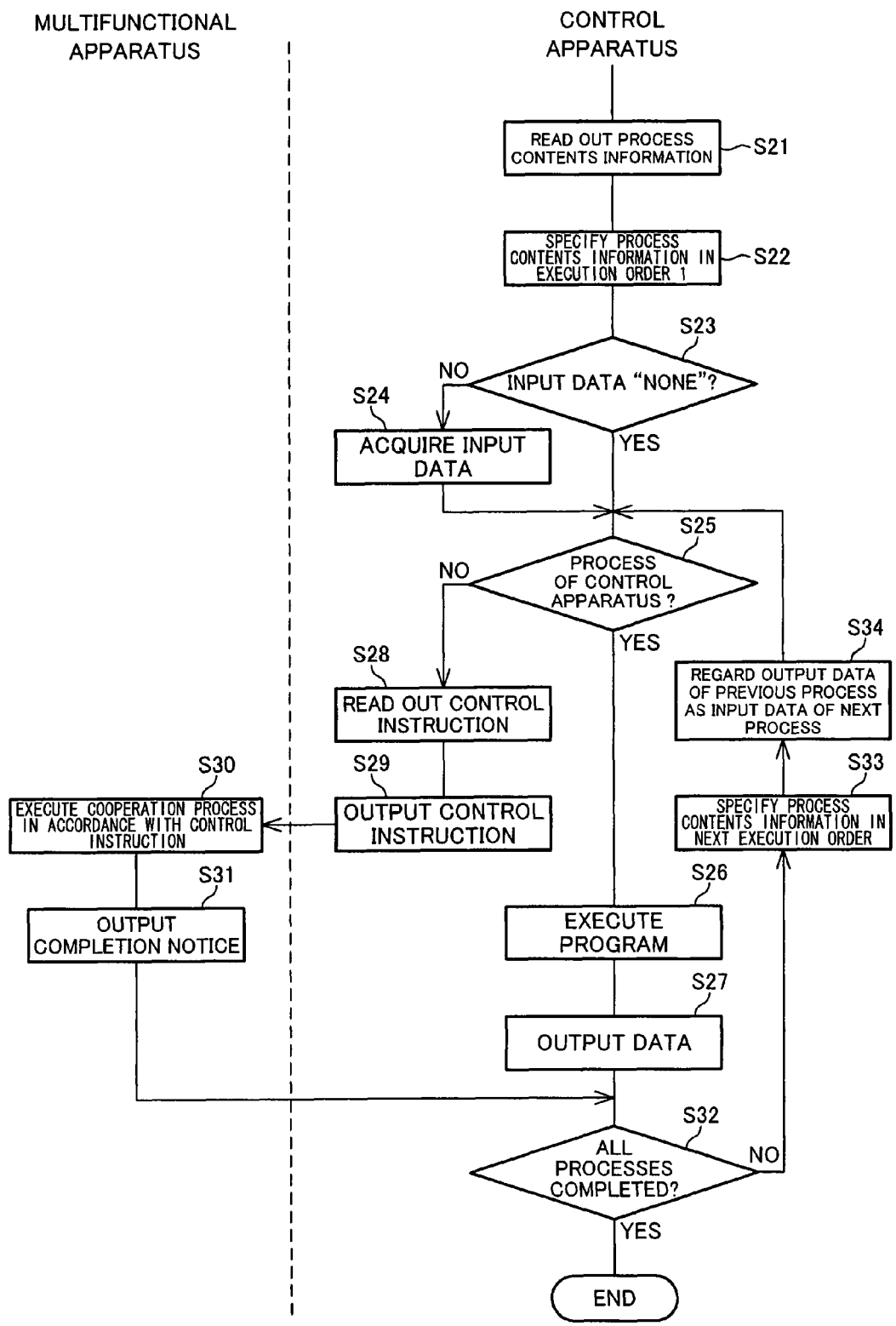
FIG. 19 is a flowchart showing a process of S15 in FIG. 1 in detail.

The following details the process in S15 with reference to a flowchart in FIG. 19.

The event process section 236 reads out, from the shortcut button storage section 237, process-execution-order information and process-contents information for each process, both of the information being corresponded with the pressed-hardware-button information and the log-in user's name supplied from the information receiving section 231 (S21).

Then, the event process section 236 designates process-contents information for a process whose execution order is "1," out of the process-contents information read out in S21 (S22). The event process section 236 judges whether input data information included in the process-contents information designated in S22 is "none" or not (S23).

When the input data information is "none" (Yes in S23), the process goes to S25. When the input data information is not "none" (No in S23), the event process section 236 acquires input data based on the input data information. That is, the event process section 236 acquires, as input data, data having a data name indicated by the input data information, from an address indicated by the input data information (S24).

Subsequently, the event process section 236 judges in S25 whether process apparatus information included in the designated process-contents information is indicative of the control apparatus 2 or not.

When the process apparatus information is indicative of the control apparatus 2 (Yes in S25), the event process section 236 designates (i) a program name indicated by process type information included in the designated process-contents information and (ii) output data format information included in the designated process-contents information, and instructs the application section 25 to execute an application program (S26). At that time, the event process section 236 supplies the input data acquired in S24 to the application section 25, too.

The application section 25 executes the program in accordance with the instruction from the event process section 236. At that time, the application section 25 executes a program designated for the input data supplied from the event process section 236. Thereafter, the application section 25 supplies data obtained by executing the program to the event process section 236 (S27). At that time, the application section 25 supplies the data in a format according to the output data format information designated by the event process section 236.

On the other hand, when the process apparatus information is indicative of the multifunctional apparatus 1 (No in S25), the event process section 236 designates (i) a device process name indicated by process type information included in the designated process-contents information and (ii) output data format information included in the process-contents information, and instructs the device control section 235 to transmit a control instruction. Note that, when input data is acquired, the event process section 236 supplies the input data to the device control section 235, too. Further, the device control section 235 reads out, from the control instruction table storage section 234, a control instruction corresponded with the device process name designated by the event process section 236 (S28). At that time, the device control section 235 causes the control instruction to include an instruction indicating that data is to be supplied in a format indicated by the output data format information designated by the event process section 236.

Then, the device control section 235 supplies the control instruction to the multifunctional apparatus 1 (S29). At that time, when the device control section 235 has already acquired input data, the device control section 235 adds the input data to the control instruction.

When the multifunctional apparatus 1 receives the control instruction, each block of the Web service layer 17 of the multifunctional apparatus 1 performs a process corresponding to the control instruction (S30).

When the process corresponding to the control instruction is finished in the Web service layer 17, the Web service layer 17 supplies a completion notice to the control apparatus 2 (S31). At that time, output data may be added to the completion notice.

Thereafter, the event process section 236 judges whether processes are performed for all process-contents information read out in S21 (S32). When processes are not performed for all process-contents information (No in S32), the event process section 236 designates process-contents information in a next execution order (S33). Then, the event process section 236 designates, as input data in a process in a next execution order, data supplied from the multifunctional apparatus 1 or the application section 25 in a process in a previous execution order (S34). Thereafter, the steps S25 to S31 are performed.

On the other hand, when processes are completely performed for all process-contents information (Yes in S32), the process is finished.

For example, the following explains a case of FIG. 14 where the event process section 236 receives a log-in user name A and pressed-hardware-button information indicating that "0 button 5b" is pressed.

At that time, the event process section 236 causes the device control section 235 to output a control instruction corresponding to a device process "scan". At that time, the device control section 235 causes the control instruction to include an instruction indicating that an output data format is "PDF". The Web service layer 17 of the multifunctional apparatus 1 instructs the OSA application layer 18 to perform a scan process in the output data format "PDF", and the service layer 13 performs the scan process. Thereafter, the Web service layer 17 transmits, to the control apparatus 2, a completion notice to which scanned PDF image data is added.

When the event process section 236 of the control apparatus 2 receives the completion notice, the event process section 236 regards output data added to the completion notice as input data in execution order 2, and supplies an instruction for performing a process in the execution order 2. Here, the event process section 236 causes the application section 25 to execute an OCR program "OCR.exe". At that time, the event process section 236 designates "RTF (Rich Text Format)" as an output data format of the application section 25 and sets parameters necessary for the application section 25 to execute the OCR program "OCR.exe". The parameters are included in process type information in the execution order 2 (not shown in FIG. 14). The application section 25 executes a translation program "Translate.exe" and outputs data in the designated data format.

Then, the event process section 236 regards output data of the OCR program "OCR.exe" as input data in execution order 3, and supplies an instruction for performing a process in the execution order 3. Here, the event process section 236 causes the application section 25 to execute the translation program "Translate.exe". At that time, the event process section 236 designates "RTF" as an output data format of the application section 25 and sets parameters necessary for the application section 25 to execute the "Translate.exe". The parameters are included in process type information in the execution order 3 (not shown in FIG. 14). Then, the application section 25 executes the translation program "Translate.exe" and outputs data in the designated data format.

Thereafter, the event process section 236 regards output data of the translation program "Translate.exe" as input data in execution order 4, and supplies an instruction for performing a process in the execution order 4. Here, the event process section 236 causes the device control section 235 to output a control instruction corresponding to a device process "printing". At that time, the device control section 235 adds input data set by the event process section 236 to the control instruction. Then, the Web service layer 17 of the multifunctional apparatus 1 instructs the OSA application layer 18 to perform a printing process and the service layer 13 performs the printing process. Thereafter, the Web service layer 17 transmits, to the control apparatus 2, a completion notice indicating that the printing process has been completely performed. With the transmission, a series of processes corresponded with the log-in user name A and the shortcut button "0 button 5b" are finished.

The following explains a case of FIG. 14 where the event process section 236 receives the log-in user name A and pressed-hardware-button information indicating that "start button 5a" is pressed.

In this case, the event process section 236 acquires input data based on input data information in execution order 1. Then, the event process section 236 causes the application section 25 to execute an editing program "Edit.exe" using the input data. At that time, the event process section 236 designates "TIF" as the output data format of the application section 25 and sets parameters necessary for the application section 25 to execute the editing program "Edit.exe". The parameters are included in process type information in the execution order 1 (not shown in FIG. 14). The application section 25 executes the editing program "Edit.exe" and outputs data in the designated data format.

Then, the event process section 236 regards output data of the editing program "Edit.exe" as input data in the execution order 2 and supplies an instruction for performing a process in the execution order 2. Here, the event process section 236 causes the device control section 235 to output a control instruction corresponding to a device process "printing". At that time, the device control section 235 adds the input data set by the event process section 236 to the control instruction. Subsequently, the Web service layer 17 of the multifunctional apparatus 1 instructs the OSA application layer 18 to perform a printing process and the service layer 13 performs the printing process. Thereafter, the Web service layer 17 transmits a completion notice indicating that the printing process has been completely performed. As a result, a series of processes corresponded with the log-in user name A and the shortcut button "start button 5a" is finished.

The following explains a case of FIG. 14 where the event process section 236 receives the log-in user name A and pressed-hardware-button information indicating that "clear button 5d" is pressed.

In this case, the event process section 236 causes the device control section 235 to output a control instruction corresponding to a device process "scan". At that time, the device control section 235 causes the control instruction to include an instruction indicating that the output data format is to be "TIF". Then, the Web service layer 17 of the multifunctional apparatus 1 instructs the OSA application layer 18 to perform a scan process in the output data format "TIF", and the service layer 13 performs the scan process. Thereafter, the Web service layer 17 transmits, to the control apparatus 2, a completion notice to which scanned PDF image data is added.

When the event process section 236 of the control apparatus 2 receives the completion notice, the event process section 236 regards output data added to the completion notice as input data in execution order 2 and supplies an instruction for performing a process in the execution order 2. Here, the information receiving section 231 causes the application section 25 to execute an image adding program "Addpage.exe". At that time, the event process section 236 designates "TIF" as the output data format of the application section 25 and sets parameters necessary for the application section 25 to execute the image adding program "Addpage.exe". The parameters are included in process type information in the execution order 2 (not shown in FIG. 14). Note that, the image adding program is a program allowing for adding one page of a predetermined document to the front of an image indicated by the image data. An example of the predetermined document is a predetermined FAX transmission sheet. Then, the application section 25 executes the image adding program "Addpage.exe" and outputs data in the designated data format.

Subsequently, the event process section 236 regards the output data of the image adding program "Addpage.exe" as input data in execution order 3 and supplies an instruction for performing a process in the execution order 3. Here, the event process section 236 causes the device control section 235 to output a control instruction corresponding to a device process "FAX transmission". At that time, the device control section 235 adds the input data set by the event process section 236 to the control instruction. The Web service layer 17 of the multifunctional apparatus 1 instructs the OSA application layer 18 to perform a FAX transmission process and the service layer 13 performs the FAX transmission process. Thereafter, the Web service layer 17 transmits, to the control apparatus 2, a completion notice indicating that the FAX transmission process has been completely performed. As a result, a series of processes corresponded with the log-in user name A and the shortcut button "clear button 5*d*" are finished.

The following explains a case of FIG. 14 where the event process section 236 receives a log-in user name B and pressed-hardware-button information indicating that "start button 5*a*" is pressed.

In this case, the event process section 236 receives input data based on input data information in execution order 1. Then, the event process section 236 causes the device control section 235 to output a control instruction corresponding to a device process "printing". At that time, the device control section 235 adds the input data set by the event process section 236 to the control instruction. The Web service layer 17 of the multifunctional apparatus 1 instructs the OSA application layer 18 to perform a printing process and the service layer 13 performs the printing process. Thereafter, the Web service layer 17 transmits, to the control apparatus 2, a completion notice indicating that the printing process has been completely performed. As a result, a series of processes corresponded with the log-in user name B and the shortcut button "start button 5*a*" are finished.

MODIFICATION EXAMPLE

Explanations were made above as to a case where the control apparatus 2 performs a log-in process. Alternatively, a multifunctional apparatus may perform the log-in process. That is, when an OK button is pressed on a log-in window, the information receiving section 231 may instruct the device control section 235 to output a control instruction for an authentication process to the multifunctional apparatus. Subsequently, the user authentication application 18*e* of the OSA application layer 18 of the multifunctional apparatus having received the control instruction may perform the authentication process.

Further, explanations were made above as to a case where: when a hardware button is pressed while a shortcut button pressing instruction window is displayed on the multifunctional apparatus 1, the event manager 17*c* of the Web service layer 17 informs the control apparatus 2 of a log-in user name. Alternatively, the control apparatus 2 may store the log-in user name used for the authentication process as long as the control apparatus 2 which performs the authentication process is identical with the control apparatus 2 which performs an event process corresponded with a shortcut button. Then, the event process section 236 designates shortcut information corresponded with a log-in user name stored in the control apparatus 2. At that time, it is unnecessary for the event manager 17*c* to inform the control apparatus 2 of the log-in user name.

Further, as described above, the system for controlling a multifunctional apparatus may include a plurality of controlling apparatuses 2. For example, the control apparatus 2 which performs the authentication process may be different from the control apparatus 2 which performs an event process corresponded with a shortcut button.

Further, the event process section 236 may cause an application section 25 of other control apparatus 2 to execute a program (such as a translation program). At that time, the shortcut button storage section 237 may cause shortcut information to include process apparatus information for identifying the other control apparatus 2. For example, the shortcut button storage section 237 may cause process-contents information corresponded with the log-in user name A and "0 button 5*b*" in FIG. 14 to include process apparatus information in execution order 2 for identifying a control apparatus 2-1 and to include process apparatus information in execution order 3 for identifying a control apparatus 2-2. At that time, the control apparatus 2-1 executes an OCR program and the control apparatus 2-2 executes a translation program.

Further, as described above, the system for controlling a multifunctional apparatus may include a plurality of multifunctional apparatuses. An address storage section 56 of each multifunctional apparatus may store the address of the same control apparatus 2. As a result, when the control apparatus 2 stores shortcut information, pressing a hardware button in any one of multifunctional apparatus allows for performing the same event process.

Explanations were made above as to a case where the shortcut button registration section 238 stores shortcut information in the shortcut button storage section 237 in accordance with information entered by a user. Alternatively, the present invention may be arranged so that: the shortcut button registration section 238 collects frequency of a process in which a shortcut button is not used (S7 as described above) with respect to each type of the process, generates shortcut information in which a process with more than predetermined frequency is corresponded with an arbitrarily selected shortcut button, and stores the shortcut information in the shortcut button storage section 237. At that time, the shortcut button registration section 238 generates a shortcut button pressing instruction window including shortcut information generated based on a result of the collection, and stores data indicative of the shortcut button pressing instruction window in the window data storage section 232. As a result, the user can comprehend which hardware button is corresponded with which event process by seeing the shortcut button pressing instruction window.

Further, explanations were made above as to a case where the shortcut button registration section 238 of the control apparatus 2 stores shortcut information in the shortcut button storage section 237 in accordance with information supplied to the UI section 125 of the control apparatus 2. Alternatively, the present invention may be arranged so that the shortcut button registration section 238 acquires, via the communication section 145, shortcut information from an external information processing apparatus and stores the shortcut information in the shortcut button storage section 237. At that time, the shortcut button registration section 238 is realized by using an Web application.

As described above, the multifunctional apparatus 1 of the present embodiment performs a device process obtained by suitably combining functions of elements which include: at least one of the document reading section 110 and the image forming section 115; and the communication section 120. The multifunctional apparatus 1 includes: the input buttons 5; the user interface layer 11 (corresponding to the button event detecting section 51) (pressed button detecting means) for detecting a pressed hardware button out of the input buttons 5; the application layer 12 (corresponding to the standard operation mode device process section 57) (first execution means) for executing a device process which has been corresponded with the hardware button detected by the user interface layer 11; the event manager 17c (corresponding to the button event informing section 55) (pressed button information informing means) for informing the external control apparatus 2 of pressed-hardware-button information indicative of the hardware button detected by the user interface layer 11; the Web service layer 17 and the OSA application layer 18 (corresponding to the OS mode device process section 58) (second execution means) for acquiring, from the control apparatus 2, a control instruction corresponded with the hardware button indicated by the pressed-hardware-button information informed by the event manager 17c and for executing a device process in accordance with the acquired control instruction; the mode switching application 12h (corresponding to the mode switching section 52) (mode setting means) for switching between (i) a standard operation mode (first mode) in which the application layer 12 operates and the Web service layer 17 and the OSA application layer 18 stop operating and (ii) an OS mode (second mode) in which the application layer 12 (except for the mode switching application 12h) stop operating and the Web service layer 17 and the OSA application layer 18 operate.

Further, the control apparatus 2 of the present embodiment is connected with the multifunctional apparatus 1 via a communication network and controls a device process of the multifunctional apparatus 1. The control apparatus 2 includes: the shortcut button storage section (storage section) 237 in which shortcut information is stored, the shortcut information being information in which (i) button identification information by which a hardware button of the multifunctional apparatus 1 is identified and (ii) at least one process-contents information (device process identification information) indicative of a device process in the multifunctional apparatus 1 are corresponded with each other; the event process section (reading means) 236 for acquiring, from the multifunctional apparatus 1, pressed-hardware-button information indicative of a pressed hardware button out of the input buttons 5 of the multifunctional apparatus 1 and for reading out, from the shortcut button storage section 237, process-contents information corresponded with button identification information indicative of the hardware button indicated by the pressed-hardware-button information; and the device control section (control instruction transmitting means) 235 for transmitting, to the multifunctional apparatus 1, a control instruction for executing a device process indicated by the process-contents information read out by the event process section 236.

With the above arrangement, when a hardware button is pressed in the standard operation mode, the application layer 12 performs a device process which has been corresponded with the hardware button. On the other hand, when the same hardware button is pressed in the OS mode, the event manager 17c informs the external control apparatus 2 of pressed-hardware-button information indicative of the pressed hardware button, and the Web service layer 17 and the OSA application layer 18 acquire, from the control apparatus 2, a control instruction corresponded with the hardware button indicated by the pressed-hardware-button information and performs a device process in accordance with the acquired control instruction.

Therefore, it is possible to perform different processes in the standard operation mode and in the OS mode in response to pressing of the same hardware button.

Further, in the OS mode, the user can use the input buttons 5 of the multifunctional apparatus 1 as a shortcut button with which a device process indicated by process-contents information included in shortcut information is performed. That is, the input buttons 5 of the multifunctional apparatus 1 are corresponded with device processes in the standard operation mode, and the input buttons 5 function as shortcut buttons in the OS mode. As a result, it is unnecessary to provide a new shortcut button.

Further, when plurality of multifunctional apparatuses 1 capable of communicating with a single control apparatus 2 are in the OS mode, the user can cause the multifunctional apparatuses 1 to perform the same process by pressing the same hardware button.

Further, the event manager 17c outputs, to the control apparatus 2, not only pressed-hardware-button information but also a log-in user name (user identification information) by which a user who is using the multifunctional apparatus 1 is identified. The event process section 236 of the control apparatus 2 acquires the log-in user name. Further, the shortcut button storage section 237 stores shortcut information with respect to each log-in user name, and the event process section 236 reads out process-contents information from shortcut information corresponded with the acquired log-in user name. Consequently, it is possible to switch shortcut information with respect to each user. As a result, each user can use a shortcut button so as to call a process which the user uses frequently.

Further, the shortcut information includes at least one program name (program identification information) by which a program is identified, said at least one program name being corresponded with button identification information. The event process section 236 reads out a program name corresponded with button identification information indicative of a button indicated by pressed-hardware-button information acquired from the multifunctional apparatus 1. Then, the application section 25 executes a program indicated by the program name. Consequently, it is possible to execute a program and a device process of the multifunctional apparatus 1 so that the program and the device process cooperate with each other, by pressing one hardware button out of the input buttons 5 of the multifunctional apparatus 1.

Each block of the multifunctional apparatus 1 and the control apparatus 2 shown in FIGS. 6, 9, and 11 may be realized by hardware logic. In the present embodiment, each block of the multifunctional apparatus 1 and the control apparatus 2 is realized by software by using the CPUs 101 and 131 as described below.

Namely, the multifunctional apparatus 1 and the control apparatus 2 include: the CPUs (central processing unit) 101 and 131 for executing a program for realizing functions of each block; the ROMs (read only memory) 107 and 137 that store the program or the HDDs (hard disc drive) 108 and 138 that store the program; the RAMs (random access memory) 106 and 136 that develop the program; the storage devices (storage mediums) 105, 135, and 140; and the like. The object of the present invention can be realized in such a manner that the multifunctional apparatus 1 and the control apparatus 2 are provided with a computer-readable storage medium for storing program codes (such as executable program, intermediate code program, and source program) of programs of the multifunctional apparatus 1 and the control apparatus 2 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the multifunctional apparatus 1 and the control apparatus 2 may be arranged so as to be connectable to a communication network so that the program code is supplied to the multifunctional apparatus 1 and the control apparatus 2 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

As described above, the multifunctional apparatus of the present invention is a multifunctional apparatus, executing a device process obtained by suitably combining element functions which include (i) at least one of an image reading function and an image forming function and (ii) a communication function, comprising: input buttons; pressed button detecting means for detecting one of the input buttons which has been pressed; first execution means for executing a device process which has been corresponded with said one of the input buttons detected by the pressed button detecting means; pressed button information informing means for informing an external control apparatus of pressed button information indicative of said one of the input buttons detected by the pressed button detecting means; second execution means for acquiring, from the control apparatus, a control instruction corresponding to said one of the input buttons indicated by the pressed button information informed by the pressed button information informing means, and for executing a device process in accordance with the acquired control instruction; and mode setting means for setting either (i) a first mode in which the first execution means operates and the pressed button information informing means and the second execution means stop operating or (ii) a second mode in which the first execution mode stops operating and the pressed button information informing means and the second execution means operate.

Further, the method of the present invention for controlling a multifunctional apparatus is a method for controlling a multifunctional apparatus which executes a device process obtained by suitably combining element functions which include (i) at least one of an image reading function and an image forming function and (ii) a communication function, said multifunctional apparatus including input buttons, said method comprising the steps of: causing pressed button detecting means to detect one of the input buttons which has been pressed; causing first execution means to execute a device process which has been corresponded with said one of the input buttons detected by the pressed button detecting means; causing pressed button information informing means to inform an external control apparatus of pressed button information indicative of said one of the input buttons detected by the pressed button detecting means; causing second execution means to acquire, from the control apparatus, a control instruction corresponding to said one of the input buttons indicated by the pressed button information informed by the pressed button information informing means, and to execute a device process in accordance with the acquired control instruction; and causing mode setting means to set either (i) a first mode in which the first execution means operates and the pressed button information informing means and the second execution means stop operating or (ii) a second mode in which the first execution mode stops operating and the pressed button information informing means and the second execution means operate.

Further, the control apparatus of the present invention is a control apparatus, connected via a communication network with the multifunctional apparatus and controlling the device process of the multifunctional apparatus, said control apparatus comprising: a storage section in which shortcut information is stored, the shortcut information being information in which (i) button identification information by which an input button of the multifunctional apparatus is identified and (ii) at least one device process identification information indicative of a device process in the multifunctional apparatus are corresponded with each other; reading means for acquiring, from the multifunctional apparatus, pressed button information indicative of a pressed input button out of the input buttons of the multifunctional apparatus, and for reading out, from the storage section, device process identification information corresponded with button identification information indicative of the input button indicated by the pressed button information; and control instruction transmitting means for transmitting, to the multifunctional apparatus, a control instruction for executing a device process indicated by the device process identification information read out by the reading means.

Further, the method of the present invention for controlling a control apparatus is a method for controlling a control apparatus which is connected via a communication network with the multifunctional apparatus and which controls the device process of the multifunctional apparatus, said control apparatus storing shortcut information in which (i) button identification information by which an input button of the multifunctional apparatus is identified and (ii) at least one device process identification information indicative of a device process in the multifunctional apparatus are corresponded with each other, the method comprising the steps of: causing reading means to acquire, from the multifunctional apparatus, pressed button information indicative of a pressed input button out of the input buttons of the multifunctional apparatus, and to read out, from the storage section, device process identification information corresponded with button identification information indicative of the input button indicated by the pressed button information; and causing control instruction transmitting means to transmit, to the multifunctional apparatus, a control instruction for executing a device process indicated by the device process identification information read out by the reading means.

Here, examples of the device process include a printing process, a copy process, a FAX transmission process, a scan process, and a document filing process in which an image having been subjected to the printing process, the FAX process, or the scan process is stored in the storage device.

With the arrangement, when an input button is pressed in the first mode, the first execution means executes a device process which has been corresponded with the input button. On the other hand, when the same input button is pressed in the second mode, the pressed button information informing means informs the external control apparatus of pressed button information indicative of the pressed input button, and the second execution means acquires, from the control apparatus, a control instruction corresponding to the input button indicated by the pressed button information, and executes a device process in accordance with the acquired control instruction.

Therefore, it is possible to perform different processes in the first mode and in the second mode in response to pressing of the same input button.

Further, the control instruction acquired by the second execution means is transmitted from the control apparatus. The control apparatus includes the storage section in which shortcut information is stored, the shortcut information being information in which (i) button identification information by which an input button of the multifunctional apparatus is identified and (ii) at least one device process identification information indicative of a device process in the multifunctional apparatus are corresponded with each other. Consequently, in the second mode, a user can use an input button of the multifunctional apparatus as a shortcut button with which a device process indicated by the device process identification information included in the shortcut information is to be executed. That is, the input button of the multifunctional apparatus is corresponded with an original device process in the first mode and the input button serves as a shortcut button only in the second mode. Consequently, it is unnecessary to provide a new shortcut button.

Further, when a plurality of multifunctional apparatuses capable of communicating with the same control apparatus are in the second mode, a user can cause the multifunctional apparatuses to execute the same device process by pressing the same input button.

As described above, with the arrangement, it is possible to execute, with only one touch, a process having been registered, without providing a new button.

Further, the multifunctional apparatus of the present invention may be arranged so that the pressed button information informing means further outputs, to the control apparatus, user identification information by which a user who is using the multifunctional apparatus is identified, and the second execution means acquires, from the control apparatus, a control instruction corresponding to the pressed button information and the user identification information informed by the pressed button information informing means.

Further, the control apparatus of the present invention may be arranged so as to further include user information acquiring means for acquiring user identification information indicative of a user who is using the multifunctional apparatus, the shortcut information being stored in the storage section with respect to each user identification information, and the reading means reading out the device process identification information from the shortcut information corresponding to the user identification information acquired by the user information acquiring means.

With the arrangement, it is possible to change shortcut information with respect to each user. Consequently, it is possible for a user to use a shortcut button so as to call a process which the user uses frequently.

Further, it is preferable to arrange the control apparatus of the present invention so that the shortcut information further includes at least one program identification information by which a program is identified, said at least one program identification information being corresponded with the button identification information, and the reading means further reads out program identification information corresponded with button identification information indicative of an input button indicated by pressed button information acquired from the multifunctional apparatus, said control apparatus further comprising program execution controlling means for causing the control apparatus or other information processing apparatus to execute a program indicated by the program identification information read out by the reading means.

With the arrangement, the shortcut information includes program identification information, and when a shortcut button is pressed, a program indicated by program identification information corresponded with the shortcut button is executed. Consequently, it is possible to perform a program and a device process of the multifunctional apparatus so that the program and the device process cooperate with each other, by pressing an input button of the multifunctional apparatus.

Further, it is preferable to arrange the control apparatus of the present invention so that: for a plurality of device process identification information included in the shortcut information, the shortcut information includes execution order information indicative of execution orders of device processes, and output data format information indicative of a data format suitable for a device process in a next execution order is added to each of the plurality of device process identification information, and the control instruction transmitting means causes the control instruction to include an instruction for outputting data in the data format indicated by the output data format information.

With the arrangement, when the second execution means of the multifunctional apparatus serially executes a plurality of device processes in accordance with a control instruction from the control apparatus, the second execution means can output data in a data format suitable for a next device process. Consequently, it is possible to execute the plurality of device processes smoothly.

Further, the control apparatus of the present invention is arranged so that input data identification information by which input data necessary for a first device process is identified is added to device process identification information corresponding to the first device process, when the input data identification information is added to the read out device process identification information, the reading means acquires input data identified by the input data identification information, and the control instruction transmitting means transmits a control instruction for executing a device process based on the input data.

Further, it is preferable to arrange the control apparatus of the present invention so that the shortcut information includes execution order information indicative of execution orders of a device process and a program, output data format information indicative of a data format suitable for a device process in a next execution order or indicative of a data format suitable for a program in a next execution order is added to the device process identification information and the program identification information, the control instruction transmitting means causes the control instruction to include an instruction for outputting data in a data format indicated by output data format information, and the program execution controlling means executes a program so that data is outputted in a data format indicated by output data format information.

With the arrangement, a program executed by the second execution means and the program execution control means of the multifunctional apparatus allows for outputting data in a data format suitable for a program or a device process to be executed subsequently. Consequently, it is possible to execute a plurality of programs or device processes smoothly.

Further, the control apparatus of the present invention is arranged so that: in a case where a device process is in a first execution order, input data identification information by which input data necessary for executing the device process is identified is added to device process identification information indicative of the device process, and when input data identification information is added to the read out device process identification information, the reading means acquires input data identified by the input data identification information and the control instruction transmitting means transmits a control instruction for executing a device process based on the input data, and in a case where a program is in a first execution order, input data identification information by which input data necessary for executing the program is identified is added to program identification information indicative of the program, and when input data identification information is added to the read out program identification information, the reading means acquires input data identified by the input data identification information and the program execution controlling means executes the program based on the input data.

Further, the control apparatus of the present invention is arranged so as to further include shortcut registering means for acquiring the shortcut information and for registering the acquired shortcut information in the storage section. Consequently, it is possible to register new shortcut information in the storage section whenever it is necessary.

Alternatively, the control apparatus of the present invention is arranged so as to further include shortcut registering means for obtaining usage frequency of each combination of a device process and a program process, and for, when the usage frequency is larger than a predetermined threshold value, automatically generating shortcut information in which device process identification information indicative of a device process with the usage frequency and program identification information indicative of a program with the usage frequency are corresponded with button identification information indicative of one of the input buttons, and storing the shortcut information in the storage section. Consequently, a combination of a device process and a program process with high usage frequency is automatically registered as shortcut information. As a result, a user can cause a combination of a device process and a program process with high usage frequency to be executed with one touch.

Further, the system of the present invention for controlling a multifunctional apparatus includes the multifunctional apparatus and the control apparatus. Consequently, it is possible to execute, with one touch, a process having been registered, without providing a new button.

Each means of the multifunctional apparatus and the control apparatus may be realized by hardware or by causing a computer to execute a program. To be specific, the control program of the present invention is a program for causing a computer to function as each means of the multifunctional apparatus or the control apparatus. The control program is stored in the storage medium of the present invention.

When the control program is executed by a computer, the computer functions as each means of the multifunctional apparatus or the control apparatus. Therefore, as with the multifunctional apparatus or the control apparatus, it is possible to realize a system in which functions of the multifunctional apparatus are controlled in an integrated manner while functions provided by the multifunctional apparatus are changed flexibly.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A multifunctional apparatus, executing a device process obtained by suitably combining element functions which include (i) at least one of an image reading function and an image forming function and (ii) a communication function, comprising:

input buttons being hardware buttons provided in an operation section of the multifunctional apparatus;

pressed button detecting means for detecting one of the input buttons of the operation section of the multifunctional apparatus which has been pressed;

first execution means for executing a device process which has been corresponded with said one of the input buttons of the operation section of the multifunctional apparatus detected by the pressed button detecting means;

pressed button information informing means for informing an external control apparatus of pressed button information indicative of said one of the input buttons of the operation section of the multifunctional apparatus detected by the pressed button detecting means;

second execution means for acquiring, from the external control apparatus, a control instruction corresponding to said one of the input buttons of the operation section of the multifunctional apparatus indicated by the pressed button information informed by the pressed button information informing means and, for executing a device process in the multifunctional apparatus in accordance with the acquired control instruction; and mode setting means for setting either (i) a first mode in which the first execution means operates and the pressed button information informing means and the second execution means stop operating or (ii) a second mode in which the first execution mode stops operating and the pressed button information informing means and the second execution means operate, wherein the first mode is executed locally by pressing the input button on the multifunctional apparatus, and the second mode is executed remotely by acquiring a control instruction from the external control apparatus that corresponds to the pressed input button, wherein if the multifunctional apparatus is in the first mode when the pressed button detecting means detects that the one of the input buttons has been pressed, the first execution means operates and the pressed button information informing means and the second execution means do not operate, and if the multifunctional apparatus is in the second mode when the pressed button detecting means detects that the one of the input buttons has been pressed, the first execution means does not operate and the pressed button information informing means and the second execution means operate.

2. The multifunctional apparatus as set forth in claim 1, wherein the pressed button information informing means further outputs, to the external control apparatus, user identification information by which a user who is using the multifunctional apparatus is identified, and the second execution means acquires, from the external control apparatus, a control instruction corresponding to the pressed button information and the user identification information informed by the pressed button information informing means.

3. An external control apparatus, connected via a communication network with a multifunctional apparatus which executes a device process obtained by suitably combining element functions which include (i) at least one of an image reading function and an image forming function and (ii) a communication function, said external control apparatus controlling the device process of the multifunctional apparatus, said multifunctional apparatus comprising:

input buttons being hardware buttons provided in an operation section of the multifunctional apparatus;

pressed button detecting means for detecting one of the input buttons of the operation section of the multifunctional apparatus which has been pressed;

first execution means for executing a device process which has been corresponded with said one of the input buttons of the operation section of the multifunctional apparatus detected by the pressed button detecting means;

pressed button information informing means for informing an-the external control apparatus of pressed button information indicative of said one of the input buttons of the operation section of the multifunctional apparatus detected by the pressed button detecting means;

second execution means for acquiring, from the external control apparatus, a control instruction corresponding to said one of the input buttons of the operation section of the multifunctional apparatus indicated by the pressed button information informed by the pressed button information informing means, and for executing a device process in the multifunctional apparatus in accordance with the acquired control instruction; and mode setting means for setting either (i) a first mode in which the first execution means operates and the pressed button information informing means and the second execution means stop operating or (ii) a second mode in which the first execution mode stops operating and the pressed button information informing means and the second execution means operate, wherein the first mode is executed locally by pressing the input button on the multifunctional apparatus, and the second mode is executed remotely by acquiring a control instruction from the external control apparatus that corresponds to the pressed input button, wherein if the multifunctional apparatus is in the first mode when the pressed button detecting means detects that the one of the input buttons has been pressed, the first execution means operates and the pressed button information informing means and the second execution means do not operate, and if the multifunctional apparatus is in the second mode when the pressed button detecting means detects that the one of the input buttons has been pressed, the first execution means does not operate and the pressed button information informing means and the second execution means operate, said external control apparatus comprising: a storage section in which shortcut information is stored, the shortcut information being information in which (i) button identification information by which an input button of the multifunctional apparatus is identified and (ii) at least one device process identification information indicative of a device process in the multifunctional apparatus are corresponded with each other;

reading means for acquiring, from the multifunctional apparatus, pressed button information indicative of a pressed input button out of the input buttons of the multifunctional apparatus, and for reading out, from the storage section, device process identification information corresponded with button identification information indicative of the input button indicated by the pressed button information; and control instruction transmitting means for transmitting, to the multifunctional apparatus, a control instruction for executing a device process indicated by the device process identification information read out by the reading means.

4. The external control apparatus as set forth in claim 3, wherein the shortcut information further includes at least one program identification information by which a program is identified, said at least one program identification information being corresponded with the button identification information, and the reading means further reads out program identification information corresponded with button identification information indicative of an input button indicated by pressed button information acquired from the multifunctional apparatus, said external control apparatus further comprising program execution controlling means for causing the external control apparatus or other information processing apparatus to execute a program indicated by the program identification information read out by the reading means.

5. The external control apparatus as set forth in claim 3, further comprising user information acquiring means for acquiring user identification information indicative of a user who is using the multifunctional apparatus, the shortcut information being stored in the storage section with respect to each user identification information, and the reading means reading out the device process identification information from the shortcut information corresponding to the user identification information acquired by the user information acquiring means.

6. The external control apparatus as set forth in claim 3, wherein for a plurality of device process identification information included in the shortcut information, the shortcut information includes execution order information indicative of execution orders of device processes, and output data format information indicative of a data format suitable for a device process in a next execution order is added to each of the plurality of device process identification information, and the control instruction transmitting means causes the control instruction to include an instruction for outputting data in the data format indicated by the output data format information.

7. The external control apparatus as set forth in claim 3, wherein input data identification information by which input data necessary for a first device process is identified is added to device process identification information corresponding to the first device process, when the input data identification information is added to the read out device process identification information, the reading means acquires input data identified by the input data identification information, and the control instruction transmitting means transmits a control instruction for executing a device process based on the input data.

8. The external control apparatus as set forth in claim 4, wherein the shortcut information includes execution order information indicative of execution orders of a device process and a program, output data format information indicative of a data format suitable for a device process in a next execution order or indicative of a data format suitable for a program in a next execution order is added to the device process identification information and the program identification information, the control instruction transmitting means causes the control instruction to include an instruction for outputting data in the data format indicated by the output data format information, and the program execution controlling means executes a program so that data is outputted in the data format indicated by the output data format information.

9. The external control apparatus as set forth in claim 4, wherein in a case where a device process is in a first execution order, input data identification information by which input data necessary for executing the device process is identified is added to device process identification information indicative of the device process, and when input data identification information is added to the read out device process identification information, the reading means acquires input data identified by the input data identification information and the control instruction transmitting means transmits a control instruction for executing a device process based on the input data, and in a case where a program is in a first execution order, input data identification information by which input data necessary for executing the program is identified is added to program identification information indicative of the program, and when input data identification information is added to the read out program identification information, the reading means acquires input data identified by the input data identification information and the program execution controlling means executes the program based on the input data.

10. The external control apparatus as set forth in claim 3, further comprising shortcut registering means for acquiring the shortcut information and for registering the acquired shortcut information in the storage section.

11. The external control apparatus as set forth in claim 4, further comprising shortcut registering means for obtaining usage frequency of each combination of a device process and a program process, and for, when the usage frequency is larger than a predetermined threshold value, automatically generating shortcut information in which device process identification information indicative of a device process with the usage frequency and program identification information indicative of a program with the usage frequency are corresponded with button identification information indicative of one of the input buttons, and storing the shortcut information in the storage section.

12. A system for controlling a multifunctional apparatus, including: a multifunctional apparatus for executing a device process obtained by suitably combining element functions which include (i) at least one of an image reading function and an image forming function and (ii) a communication function; and an external control apparatus connected via a communication network with the multifunctional apparatus and controlling the device process of the multifunctional apparatus, said multifunctional apparatus comprising:

input buttons being hardware buttons provided in an operation section of the multifunctional apparatus;

pressed button detecting means for detecting one of the input buttons of the operation section of the multifunctional apparatus which has been pressed;

first execution means for executing a device process which has been corresponded with said one of the input buttons of the operation section of the multifunctional apparatus detected by the pressed button detecting means;

pressed button information informing means for informing an-the external control apparatus of pressed button information indicative of said one of the input buttons of the operation section of the multifunctional apparatus detected by the pressed button detecting means;

second execution means for acquiring, from the external control apparatus, a control instruction corresponding to said one of the input buttons of the operation section of the multifunctional apparatus indicated by the pressed button information informed by the pressed button information informing means, and for executing a device process in the multifunctional apparatus in accordance with the acquired control instruction; and mode setting means for setting either (i) a first mode in which the first execution means operates and the pressed button information informing means and the second execution means stop operating or (ii) a second mode in which the first execution mode stops operating and the pressed button information informing means and the second execution means operate, wherein the first mode is executed locally by pressing the input button on the multifunctional apparatus, and the second mode is executed remotely by acquiring a control instruction from the external control apparatus that corresponds to the pressed input button, wherein if the multifunctional apparatus is in the first mode when the pressed button detecting means detects that the one of the input buttons has been pressed, the first execution means operates and the pressed button information informing means and the second execution means do not operate, and if the multifunctional apparatus is in the second mode when the pressed button detecting means detects that the one of the input buttons has been pressed, the first execution means does not operate and the pressed button information informing means and the second execution means operate, and said external control apparatus comprising:

a storage section in which shortcut information is stored, the shortcut information being information in which (i) button identification information by which an input button of the multifunctional apparatus is identified and (ii) at least one device process identification information indicative of a device process in the multifunctional apparatus are corresponded with each other;

reading means for acquiring, from the multifunctional apparatus, pressed button information indicative of a pressed input button out of the input buttons of the multifunctional apparatus, and for reading out, from the storage section, device process identification information corresponded with button identification information indicative of the input button indicated by the pressed button information; and control instruction transmitting means for transmitting, to the multifunctional apparatus, a control instruction for executing a device process indicated by the device process identification information read out by the reading means.

13. A non-transitory computer-readable storage medium, in which a control program is stored, said control program operating a multifunctional apparatus which executes a device process obtained by suitably combining element functions which include (i) at least one of an image reading function and an image forming function and (ii) a communication function, said multifunctional apparatus including:

input buttons being hardware buttons provided in an operation section of the multifunctional apparatus;

pressed button detecting means for detecting one of the input buttons of the operation section of the multifunctional apparatus which has been pressed;

first execution means for executing a device process which has been corresponded with said one of the input buttons of the operation section of the multifunctional apparatus detected by the pressed button detecting means;

pressed button information informing means for informing an external control apparatus of pressed button information indicative of said one of the input buttons of the operation section of the multifunctional apparatus detected by the pressed button detecting means;

second execution means for acquiring, from the external control apparatus, a control instruction corresponding to said one of the input buttons of the operation section of the multifunctional apparatus indicated by the pressed button information informed by the pressed button information informing means, and for executing a device process in the multifunctional apparatus in accordance with the acquired control instruction; and mode setting means for setting either (i) a first mode in which the first execution means operates and the pressed button information informing means and the second execution means stop operating or (ii) a second mode in which the first execution mode stops operating and the pressed button information informing means and the second execution means operate, wherein the first mode is executed locally by pressing the input button on the multifunctional apparatus, and the second mode is executed remotely by acquiring a control instruction from the external control apparatus that corresponds to the pressed input button, wherein if the multifunctional apparatus is in the first mode when the pressed button detecting means detects that the one of the input buttons has been pressed, the first execution means operates and the pressed button information informing means and the second execution means do not operate, and if the multifunctional apparatus is in the second mode when the pressed button detecting means detects that the one of the input buttons has been pressed, the first execution means does not operate and the pressed button information informing means and the second execution means operate, said control program causing a computer to function as each means of the multifunctional apparatus.

14. A non-transitory computer-readable storage medium, in which a control program is stored, said control program operating an external control apparatus connected via a communication network with a multifunctional apparatus which executes a device process obtained by suitably combining element functions which include (i) at least one of an image reading function and an image forming function and (ii) a communication function, said external control apparatus controlling the device process of the multifunctional apparatus, said multifunctional apparatus comprising:

input buttons being hardware buttons provided in an operation section of the multifunctional apparatus;

pressed button detecting means for detecting one of the input buttons of the operation section of the multifunctional apparatus which has been pressed;

first execution means for executing a device process of the operation section of the multifunctional apparatus which has been corresponded with said one of the input buttons detected by the pressed button detecting means;

pressed button information informing means for informing an-the external control apparatus of pressed button information indicative of said one of the input buttons of the operation section of the multifunctional apparatus detected by the pressed button detecting means;

second execution means for acquiring, from the external control apparatus, a control instruction corresponding to said one of the input buttons of the operation section of the multifunctional apparatus indicated by the pressed button information informed by the pressed button information informing means, and for executing a device process in the multifunctional apparatus in accordance with the acquired control instruction; and mode setting means for setting either (i) a first mode in which the first execution means operates and the pressed button information informing means and the second execution means stop operating or (ii) a second mode in which the first execution mode stops operating and the pressed button information informing means and the second execution means operate, wherein the first mode is executed locally by pressing the input button on the multifunctional apparatus, and the second mode is executed remotely by acquiring a control instruction from the external control apparatus that corresponds to the pressed input button, wherein if the multifunctional apparatus is in the first mode when the pressed button detecting means detects that the one of the input buttons has been pressed, the first execution means operates and the pressed button information informing means and the second execution means do not operate, and if the multifunctional apparatus is in the second mode when the pressed button detecting means detects that the one of the input buttons has been pressed, the first execution means does not operate and the pressed button information informing means and the second execution means operate, said external control apparatus comprising:

a storage section in which shortcut information is stored, the shortcut information being information in which (i)

button identification information by which an input button of the multifunctional apparatus is identified and (ii) at least one device process identification information indicative of a device process in the multifunctional apparatus are corresponded with each other;

reading means for acquiring, from the multifunctional apparatus, pressed button information indicative of a pressed input button out of the input buttons of the multifunctional apparatus, and for reading out, from the storage section, device process identification information corresponded with button identification information indicative of the input button indicated by the pressed button information; and control instruction transmitting means for transmitting, to the multifunctional apparatus, a control instruction for executing a device process indicated by the device process identification information read out by the reading means, said control program causing a computer to function as each means of the external control apparatus.

15. A method for controlling a multifunctional apparatus which executes a device process obtained by suitably combining element functions which include (i) at least one of an image reading function and an image forming function and (ii) a communication function, said multifunctional apparatus including input buttons being hardware buttons provided in an operation section of the multifunctional apparatus, said method comprising the steps of:

causing pressed button detecting means to detect one of the input buttons of the operation section of the multifunctional apparatus which has been pressed;

causing first execution means to execute a device process which has been corresponded with said one of the input buttons of the operation section of the multifunctional apparatus detected by the pressed button detecting means;

causing pressed button information informing means to inform an external control apparatus of pressed button information indicative of said one of the input buttons of the operation section of the multifunctional apparatus detected by the pressed button detecting means;

causing second execution means to acquire, from the external control apparatus, a control instruction corresponding to said one of the input buttons of the operation section of the multifunctional apparatus indicated by the pressed button information informed by the pressed button information informing means, and to execute a device process in the multifunctional apparatus in accordance with the acquired control instruction; and causing mode setting means to set either (i) a first mode in which the first execution means operates and the pressed button information informing means and the second execution means stop operating or (ii) a second mode in which the first execution mode stops operating and the pressed button information informing means and the second execution means operate, wherein the first mode is executed locally by pressing the input button on the multifunctional apparatus, and the second mode is executed remotely by acquiring a control instruction from the external control apparatus that corresponds to the pressed input button, wherein if the multifunctional apparatus is in the first mode when the pressed button detecting means detects that the one of the input buttons has been pressed, the first execution means operates and the pressed button information informing means and the second execution means do not operate, and if the multifunctional apparatus is in the second mode when the pressed button detecting means detects that the one of the input buttons has been pressed, the first execution means does not operate and the pressed button information informing means and the second execution means operate.

16. A method for controlling an external control apparatus connected via a communication network with a multifunctional apparatus which executes a device process obtained by suitably combining element functions which include (i) at least one of an image reading function and an image forming function and (ii) a communication function, said external control apparatus controlling the device process of the multifunctional apparatus, said multifunctional apparatus comprising:

input buttons being hardware buttons provided in an operation section of the multifunctional apparatus;

pressed button detecting means for detecting one of the input buttons of the operation section of the multifunctional apparatus which has been pressed;

first execution means for executing a device process which has been corresponded with said one of the input buttons of the operation section of the multifunctional apparatus detected by the pressed button detecting means;

pressed button information informing means for informing an-the external control apparatus of pressed button information indicative of said one of the input buttons of the operation section of the multifunctional apparatus detected by the pressed button detecting means;

second execution means for acquiring, from the external control apparatus, a control instruction corresponding to said one of the input buttons of the operation section of the multifunctional apparatus indicated by the pressed button information informed by the pressed button information informing means, and for executing a device process in the multifunctional apparatus in accordance with the acquired control instruction; and mode setting means for setting either (i) a first mode in which the first execution means operates and the pressed button information informing means and the second execution means stop operating or (ii) a second mode in which the first execution mode stops operating and the pressed button information informing means and the second execution means operate, wherein the first mode is executed locally by pressing the input button on the multifunctional apparatus, and the second mode is executed remotely by acquiring a control instruction from the external control apparatus that corresponds to the pressed input button, wherein if the multifunctional apparatus is in the first mode when the pressed button detecting means detects that the one of the input buttons has been pressed, the first execution means operates and the pressed button information informing means and the second execution means do not operate, and if the multifunctional apparatus is in the second mode when the pressed button detecting means detects that the one of the input buttons has been pressed, the first execution means does not operate and the pressed button information informing means and the second execution means operate, said external control apparatus storing shortcut information in which (i) button identification information by which an input button of the multifunctional apparatus is identified and (ii) at least one device process identification information indicative of a device process in the multifunctional apparatus are corresponded with each other, said method comprising the steps of:

causing reading means to acquire, from the multifunctional apparatus, pressed button information indicative of a pressed input button out of the input buttons of the multifunctional apparatus, and to read out, from the storage section, device process identification information corresponded with button identification information indicative of the input button indicated by the pressed button information; and causing control instruction transmitting means to transmit, to the multifunctional apparatus, a control instruction for executing a device process indicated by the device process identification information read out by the reading means.

* * * * *